(12) United States Patent
Sakawaki et al.

(10) Patent No.: US 12,442,873 B2
(45) Date of Patent: Oct. 14, 2025

(54) MAGNETIC SENSOR, METHOD OF MANUFACTURING MAGNETIC SENSOR, AND SENSITIVE ELEMENT ASSEMBLY

(71) Applicant: Resonac Corporation, Tokyo (JP)

(72) Inventors: Akira Sakawaki, Tokyo (JP); Daizo Endo, Tokyo (JP); Sho Tonegawa, Tokyo (JP); Yasumasa Watanabe, Tokyo (JP)

(73) Assignee: Resonac Corporation, Tokyo (JP)

( * ) Notice: Subject to any disclaimer, the term of this patent is extended or adjusted under 35 U.S.C. 154(b) by 212 days.

(21) Appl. No.: 18/342,839

(22) Filed: Jun. 28, 2023

(65) Prior Publication Data

US 2024/0003996 A1    Jan. 4, 2024

(30) Foreign Application Priority Data

Jun. 30, 2022   (JP) .................. 2022-106078

(51) Int. Cl.
 *G01R 33/06* (2006.01)
 *G01R 33/00* (2006.01)
 *H01F 10/16* (2006.01)

(52) U.S. Cl.
 CPC ....... *G01R 33/063* (2013.01); *G01R 33/0052* (2013.01); *H01F 10/16* (2013.01)

(58) Field of Classification Search
 CPC .............. G01R 33/063; G01R 33/0052; G01R 33/0005; G01R 33/0011; H01F 10/16; H01F 10/132; H01F 10/265; H01F 41/18
 USPC ....................................................... 324/249
 See application file for complete search history.

(56) References Cited

U.S. PATENT DOCUMENTS

| | | | |
|---|---|---|---|
| 2020/0264243 A1 | 8/2020 | Endo | |
| 2021/0373093 A1* | 12/2021 | Endo | G01R 33/0011 |
| 2022/0099760 A1 | 3/2022 | Endo et al. | |
| 2022/0128634 A1* | 4/2022 | Tonegawa | H10N 50/01 |

FOREIGN PATENT DOCUMENTS

| | | | | |
|---|---|---|---|---|
| EP | 3 974 857 A1 | 3/2022 | | |
| EP | 4394417 A1 * | 7/2024 | ........... | G01R 33/072 |
| JP | 61295606 A | 12/1986 | | |
| JP | 2019-67869 A | 4/2019 | | |

OTHER PUBLICATIONS

Translation of JP61295606A (Year: 1986).*
German Office Action dated Nov. 11, 2024 in DE Application No. 102023116486.4.

* cited by examiner

*Primary Examiner* — Christopher P McAndrew
(74) *Attorney, Agent, or Firm* — Sughrue Mion, PLLC

(57) ABSTRACT

A magnetic sensor includes: a substrate; and a sensitive portion disposed on the substrate and having a longitudinal direction and a transverse direction. The sensitive portion senses a magnetic field by a magnetic impedance effect. The sensitive portion includes a soft magnetic material layer composed of a soft magnetic material having uniaxial magnetic anisotropy in a direction intersecting the longitudinal direction and sensing the magnetic field. The sensitive portion also includes a secondary soft magnetic material layer laminated between the substrate and the soft magnetic material layer. The secondary soft magnetic material layer is composed of a soft magnetic material with large saturation magnetization compared to the soft magnetic material constituting the soft magnetic material layer.

12 Claims, 14 Drawing Sheets

201  10A 201  10A  101

201  10A  101  102a

INNER CIRCUMFERENCE SIDE ←→ OUTER CIRCUMFERENCE SIDE

LONGITUDINAL DIRECTION

MAGNETIC SENSOR, METHOD OF MANUFACTURING MAGNETIC SENSOR, AND SENSITIVE ELEMENT ASSEMBLY

CROSS REFERENCE TO RELATED APPLICATIONS

This application is based on and claims priority under 35 USC § 119 to Japanese Patent Application No. 2022-106078 filed Jun. 30, 2022, the disclosure is incorporated herein by reference in its entirety.

BACKGROUND

Technical Field

The present invention relates to a magnetic sensor, a method of manufacturing the magnetic sensor, and a sensitive element assembly.

Related Art

As a previous publication in the art, Patent Document 1 discloses a magnetic sensor including a substrate and a magnetic sensor body disposed on the substrate and composed of a soft magnetic material. In the magnetic sensor, soft magnetic material layers are deposited by the magnetron sputtering to form the magnetic sensor body.

CITATION LIST

Patent Literature

Patent Document 1: Japanese Patent Application Laid-Open Publication No. 2019-SUMMARY When a magnetic sensor with a sensitive portion is formed by laminating soft magnetic material layers on a substrate, there may be variations in magnetic properties among plural sensitive portions formed on the same substrate or among plural magnetic sensors formed by using the same substrate depending on the positions on the substrate.

It is an object of an embodiment of the present invention to reduce differences in magnetic properties among plural sensitive portions or plural magnetic sensors formed from the same substrate.

According to an embodiment of the present invention, following (1) to (12) are provided.

(1) A magnetic sensor including: a substrate (substrate 10); and at least one sensitive portion (sensitive portion 31) disposed on the substrate and having a longitudinal direction and a transverse direction, the sensitive portion sensing a magnetic field by a magnetic impedance effect, the sensitive portion including a soft magnetic material layer (soft magnetic material layer 102) composed of a soft magnetic material having uniaxial magnetic anisotropy in a direction intersecting the longitudinal direction, the soft magnetic material layer sensing the magnetic field, and a secondary soft magnetic material layer (pre-coat layer 101) laminated between the substrate and the soft magnetic material layer, the secondary soft magnetic material layer being composed of a soft magnetic material with large saturation magnetization compared to the soft magnetic material constituting the soft magnetic material layer.

(2) The magnetic sensor described in (1), wherein the secondary soft magnetic material layer has a thickness less than or equal to 30% of a thickness of the soft magnetic material layer.

(3) The magnetic sensor described in (1) or (2), wherein the secondary soft magnetic material layer has a thickness greater than or equal to 5 nm.

(4) The magnetic sensor described in any one of (1) to (3), wherein at least one sensitive element includes plural sensitive portions arranged in the transverse direction with a gap between adjacent two of the sensitive portions, each of the sensitive portions including the soft magnetic material layer and the secondary soft magnetic material layer.

(5) The magnetic sensor described in any one of (1) to (4), wherein the at least one sensitive portion includes the plural soft magnetic material layers laminated, adjacent two of the soft magnetic material layers sandwiching a conductor layer (conductor layer 104) with conductivity higher than the soft magnetic material layer, and the secondary soft magnetic material layer is laminated between the substrate and one of the plural soft magnetic material layers nearest the substrate (first soft magnetic material layer 102a).

(6) The magnetic sensor described in (5), wherein the at least one sensitive portion includes another secondary soft magnetic material layer (second pre-coat layer 101b) between the conductor layer and one of the plural soft magnetic material layers nearest the conductor layer, the another secondary soft magnetic material layer composed of a soft magnetic material with large saturation magnetization compared to the soft magnetic material constituting the soft magnetic material layer.

(7) The magnetic sensor described in any one of (1) to (6), wherein the at least one sensitive portion includes the plural soft magnetic material layers and a magnetic domain suppression layer (magnetic domain suppression layer 103) between adjacent two of the plural soft magnetic material layers, the magnetic domain suppression layer suppressing generation of a closure magnetic domain in the soft magnetic material layers, and the secondary soft magnetic material layer is laminated between the substrate and one of the plural soft magnetic material layers nearest the substrate.

(8) The magnetic sensor described in any one of (1) to (7), wherein the soft magnetic material layer is composed of an amorphous alloy containing Co, Nb and Zr, and the secondary soft magnetic material layer is composed of an amorphous alloy containing Co, Nb and Zr, the amorphous alloy for the secondary soft magnetic material layer having a small Nb ratio compared to the amorphous alloy constituting the soft magnetic material layer.

(9) The magnetic sensor described in any one of (1) to (7), wherein the soft magnetic material layer is composed of an amorphous alloy based on Co, and the secondary soft magnetic material layer is composed of an amorphous alloy based on Co with large saturation magnetization compared to the amorphous alloy constituting the soft magnetic material layer.

(10) The magnetic sensor described in (7), wherein the magnetic domain suppression layer is composed of any one of Ru, CrTi, AlTi, CrB, CrTa, CoW, NiP, and $SiO_2$.

(11) A method of manufacturing a magnetic sensor including: forming an underlayer (pre-coat layer 101) by laminating a soft magnetic material with a predetermined saturation magnetization on a surface of a substrate (substrate 10A) by magnetron sputtering; forming a soft magnetic material layer (soft magnetic material layer 102) with uniaxial magnetic anisotropy in a predetermined direction by laminating a soft magnetic material on the underlayer, the soft magnetic material for the soft magnetic material layer having small saturation magnetization compared to the soft magnetic material constituting the underlayer by magnetron sputtering; and forming plural sensitive elements (sensitive elements 30) at a portion of the soft magnetic material layer where the uniaxial magnetic anisotropy is imparted, the plural sensitive elements sensing a magnetic field.

(12) A sensitive element assembly including: a substrate (substrate 10A); and plural sensitive elements (sensitive elements 30) each having at least one sensitive portion (sensitive portion 31) formed on a surface of the substrate and having a longitudinal direction and a transverse direction, the sensitive portion sensing a magnetic field by a magnetic impedance effect, the sensitive portion in each of the sensitive elements including a soft magnetic material layer (soft magnetic material layer 102) composed of a soft magnetic material having uniaxial magnetic anisotropy in a direction intersecting the longitudinal direction and sensing the magnetic field, and a secondary soft magnetic material layer (pre-coat layer 101) laminated between the substrate and the soft magnetic material layer, the secondary soft magnetic material layer being composed of a soft magnetic material with large saturation magnetization compared to the soft magnetic material constituting the soft magnetic material layer.

An embodiment of the present invention reduces differences in magnetic properties among plural sensitive elements or plural magnetic sensors formed from the same substrate.

BRIEF DESCRIPTION OF THE DRAWINGS

An exemplary embodiment of the present invention will be described in detail based on the following figures, wherein:

FIG. 1 is a plan view;

FIG. 2 is a cross-sectional view taken along the line II-II in FIG. 1;

DETAILED DESCRIPTION

An exemplary embodiment of the present invention will be described below with reference to the attached drawings.
(Configuration of a Magnetic Sensor 1)

Figure 1:
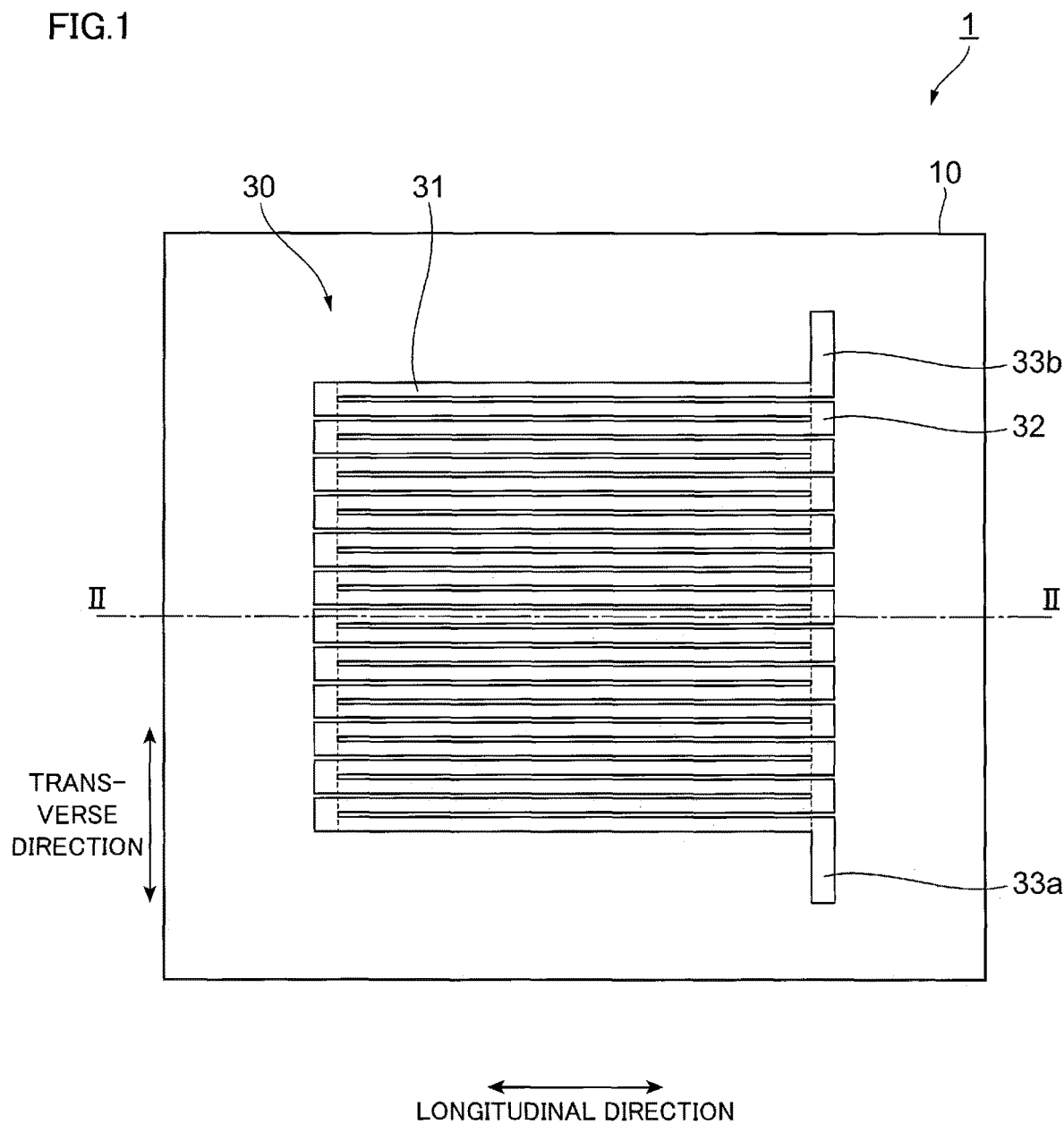
FIG. 1 illustrates a specific example of a magnetic sensor according to an embodiment, where
Figure 2:
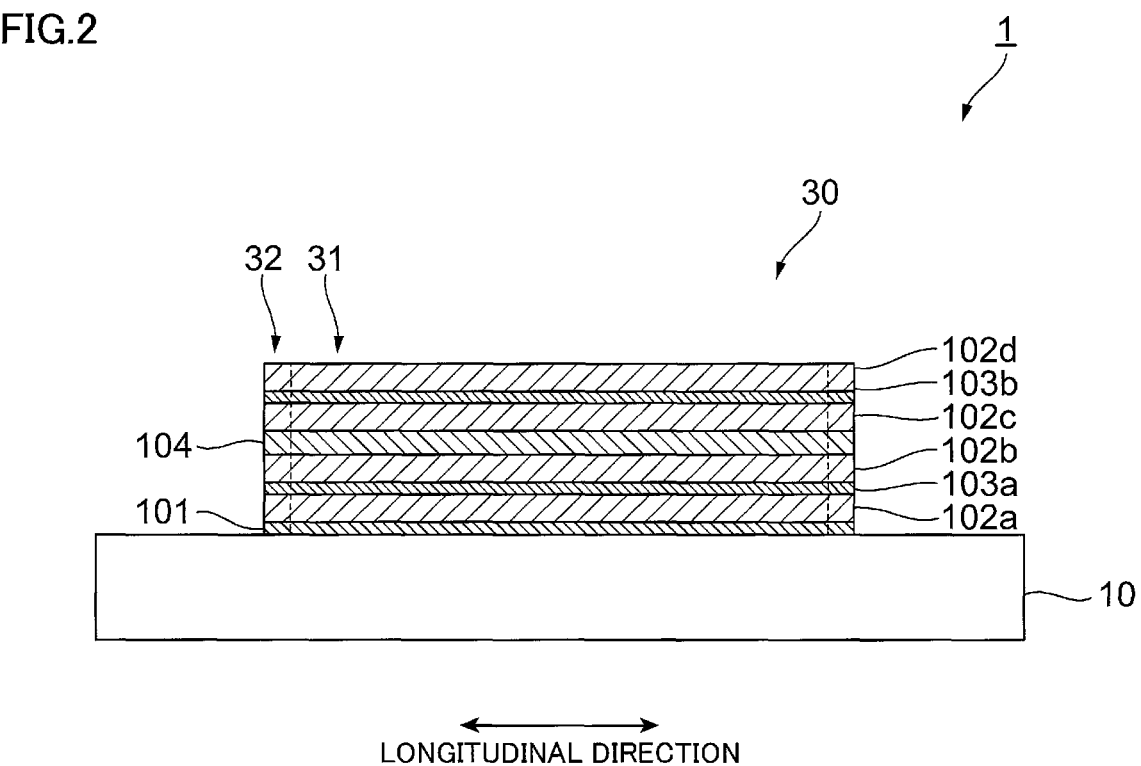
FIG. 2 illustrates a specific example of a magnetic sensor according to an embodiment, where

FIGS. 1 and 2 illustrate a specific example of a magnetic sensor 1 according to the present embodiment, where FIG. 1 is a plan view, and FIG. 2 is a cross-sectional view taken along the line II-II in FIG. 1.

As shown in FIGS. 1 and 2, the magnetic sensor 1 according to the present embodiment includes a non-magnetic substrate 10 and a sensitive element 30 disposed on the substrate 10 and including soft magnetic material layers to sense a magnetic field. A cross-sectional structure of the magnetic sensor 1 shown in FIG. 2 will be detailed in subsequent paragraphs.

A soft magnetic material refers to a so-called low coercivity material that is easily magnetizable by an external magnetic field but quickly returns to a non-magnetized or low magnetized state upon removal of the external magnetic field.

Referring to FIG. 1, a planar structure of the magnetic sensor 1 is described. By way of example, the magnetic sensor 1 has a quadrangular planar shape. Each side of the planar shape of the magnetic sensor 1 is several millimeters in length. The length of one side of the magnetic sensor 1 can be, for example, from about 1 mm to 10 mm. Note that the size of the planar shape of the magnetic sensor 1 may have any other values. Also, the magnetic sensor 1 may have any other planar shape than quadrangles.

The sensitive element 30 disposed on the substrate 10 is now described. The sensitive element 30 includes plural sensitive portions 31 each being of a strip-like planar shape having longitudinal and transverse directions. In FIG. 1, a left-right direction on the page corresponds to the longitudinal direction of the sensitive element 30, and an up-down direction on the page corresponds to the transverse direction of the sensitive element 30. The plural sensitive portions 31 are arranged such that their longitudinal directions are parallel to each other with a gap therebetween in the transverse direction. The sensitive element 30 includes: connecting portions 32 connecting respective adjacent sensitive portions 31 in series in a serpentine pattern; and terminal portions 33 connected with electric wires for electric current supply.

While the sensitive element 30 shown in FIG. 1 has twenty-four sensitive portions 31, the number of sensitive portions 31 is not limited to twenty-four.

The sensitive portions 31 in the present embodiment sense a magnetic field or any changes in the magnetic field to produce a magnetic impedance effect. In other words, in the sensitive portions 31, the magnetic field or any changes in the magnetic field are measured using changes in the impedance of the sensitive element 30, in which the sensitive portions 31 are connected in series. Hereinafter, the impedance of the sensitive element 30 may be referred to as impedance of the magnetic sensor 1.

Each connecting portion 32 is disposed between ends of respective adjacent sensitive portions 31 to connect the respective adjacent sensitive positions 31 in series in a serpentine pattern.

The terminal portions 33 (terminal portions 33a, 33b) are disposed at two respective ends of the sensitive portions 31 that are not connected with any connecting portion 32. The terminal portions 33 serve as pad portions to be connected with electric wires for electric current supply. The terminal portions 33 may have a size that allows for connection of the electric wires. While the terminal portions 33 (terminal portions 33a, 33b) are disposed on the right side in the page of FIG. 1, both of the terminal portions 33 may be disposed on the left side, or one and the other of the terminal portions 33 may be respectively disposed on the right and left sides.

Here, a length of the sensitive portion 31 in the longitudinal direction is defined as a length L. A width of the sensitive portion 31 in the transverse direction is defined as a width W. A gap between two adjacent sensitive portions 31 is defined as a gap G. For example, the length L of the sensitive portion 31 is from 1 mm to 10 mm, the width W is from 10 μm to 150 μm, and the gap G is from 10 μm to 150 μm. Note that the size (length L, width W, thickness, etc.) of each sensitive portion 31, the number of sensitive portions 31, the gap G between the sensitive portions 31, and other parameters may be set depending on the size of the magnetic field to be sensed (i.e., measured) and other factors.

Now referring to FIG. 2, a cross-sectional structure of the magnetic sensor 1 is described.

The substrate 10 is made of a non-magnetic material. Specific examples of the substrate 10 include an oxide substrate such as glass and sapphire, a semiconductor substrate such as silicon, and a metal substrate such as aluminum, stainless steel, and a metal plated with nickel phosphorus. When the substrate 10 is highly conductive, an insulator layer providing electrical insulation between the substrate 10 and the sensitive element 30 may be disposed at the surface of the substrate 10 on which the sensitive element 30 is to be disposed. Specific examples of insulators constituting the insulator layer include oxides such as $SiO_2$, $Al_2O_3$, and $TiO_2$, and nitrides such as $Si_3N_4$ and AlN. Here, the substrate 10 is described as being a glass substrate.

By way of example, the sensitive element 30 includes four soft magnetic material layers 102 (a first soft magnetic material layer 102a, a second soft magnetic material layer 102b, a third soft magnetic material layer 102c, a fourth soft magnetic material layer 102d) in this order from closest to farthest from the substrate 10. Between the substrate 10 and the first soft magnetic material layer 102a, the sensitive element 30 includes a pre-coat layer 101 composed of a soft magnetic material whose saturation magnetization Ms is larger than the saturation magnetization of the soft magnetic material that constitutes the soft magnetic material layers 102. Between the first soft magnetic material layer 102a and the second soft magnetic material layer 102b, the sensitive element 30 further includes a first magnetic domain suppression layer 103a to suppress generation of closure magnetic domains in the first soft magnetic material layer 102a and the second soft magnetic material layer 102b. Between the third soft magnetic material layer 102c and the fourth soft magnetic material layer 102d, the sensitive element 30 further includes a second magnetic domain suppression layer 103b to suppress generation of closure magnetic domains in the third soft magnetic material layer 102c and the fourth soft magnetic material layer 102d. The sensitive element 30 further includes a conductor layer 104 between the second soft magnetic material layer 102b and the third soft magnetic material layer 102c to reduce resistance (herein, electric resistance) of the sensitive element 30. In the description of the present embodiment, the first soft magnetic material layer 102a, the second soft magnetic material layer 102b, the third soft magnetic material layer 102c, and the fourth soft magnetic material layer 102d are collectively referred to as the soft magnetic material layers 102 unless the distinction is necessary. Similarly, the first magnetic domain suppression layer 103a and the second magnetic domain suppression layer 103b are collectively referred to as the magnetic domain suppression layers 103 unless the distinction is necessary.

Each soft magnetic material layer 102 is composed of a soft magnetic material of an amorphous alloy that provides a magnetic impedance effect. The soft magnetic material layer 102 in the present embodiment is composed of a soft magnetic material of an amorphous alloy based on Co (hereinafter denoted as the Co alloy constituting the soft magnetic material layer 102). As will be described later, compared with the soft magnetic material constituting the pre-coat layer 101, the saturation magnetization (hereinafter denoted as the saturation magnetization Ms) is small in the Co alloy constituting the soft magnetic material layer 102. As such a Co alloy constituting the soft magnetic material layer 102, it is preferable to use an amorphous alloy which is based on Co and added with high melting point metal Nb, Ta, W, or the like. More concretely, specific examples of materials for the Co alloy constituting the soft magnetic material layer 102 include such as CoNbZr, CoFeTa, CoWZr, CoFeCrMnSib.

For example, each soft magnetic material layer 102 (the first soft magnetic material layer 102a, the second soft magnetic material layer 102b, the third soft magnetic material layer 102c, the fourth soft magnetic material layer 102d) has a thickness of from 100 nm to 1 μm. The thickness of each soft magnetic material layer 102 may be the same to each other or may be different from each other.

The soft magnetic material layers 102 are provided with uniaxial magnetic anisotropy in a direction intersecting the longitudinal direction, e.g., the transverse direction (the up-down direction in FIG. 1). Note that the direction intersecting the longitudinal direction may be a direction angled at greater than 45 degrees and less than or equal to 90 degrees with respect to the longitudinal direction. Though details will be described later, this impartation of the uniaxial magnetic anisotropy of the soft magnetic material layers 102 can be done by using a magnetron sputtering method by depositing the soft magnetic material layers 102.

The pre-coat layer 101 is a specific example of a secondary soft magnetic material layer or an underlayer. Although the details will be described later, the pre-coat layer 101 is disposed to reduce the difference in properties among the plural magnetic sensors 1 formed from a single substrate 10A (see FIG. 4A, FIG. 6, etc. below) or among the plural sensitive portions 31 in the sensitive element 30 of each magnetic sensor 1.

The pre-coat layer 101 is composed of a soft magnetic material with a large saturation magnetization Ms as compared to the soft magnetic material constituting the soft magnetic material layer 102.

Generally, plural magnetic domains having different magnetization directions are formed in the soft magnetic material constituting the pre-coat layer 101 and the soft magnetic material layer 102. As an external magnetic field increases, magnetic domain walls move in the soft magnetic material, and an area of the magnetic domain whose magnetization direction is the same as the direction of the external magnetic field increases, while an area of the magnetic domain whose magnetization direction is opposite to the direction of the external magnetic field decreases. As the external magnetic field increases further, magnetization rotation takes place in the magnetic domain whose magnetization direction is different from the direction of the external magnetic field, whereby the magnetization direction of that domain is oriented in the same direction as the external magnetic field. Finally, the magnetic domain wall that has existed between adjacent magnetic domains disappears, and the adjacent magnetic domains combine into a magnetic domain (a single magnetic domain).

In the soft magnetic material, the state in which magnetic domain walls have disappeared due to a magnetic field is referred to as saturation of the magnetization. The magnetization of the soft magnetic material in the saturated state is referred to as the saturation magnetization Ms.

The saturation magnetization Ms of the soft magnetic material constituting the soft magnetic material layer 102 may have range of greater than or equal to 200 emu/cc and less than or equal to 1100 emu/cc, for example.

The difference between the saturation magnetization Ms of the soft magnetic material constituting the pre-coat layer 101 and the saturation magnetization Ms of the soft magnetic material constituting the soft magnetic material layer 102 can be in the range of greater than or equal to 100 emu/cc and less than or equal to 600 emu/cc, for example, though depending on the type, etc. of the soft magnetic material constituting the soft magnetic material layer 102.

The pre-coat layer 101 in the present embodiment is composed of a soft magnetic material of an amorphous alloy based on Co whose saturation magnetization Ms is large compared to the Co alloy constituting the soft magnetic material layer 102 (hereinafter denoted as the Co alloy constituting the soft magnetic material layer 102). As such a Co alloy constituting the pre-coat layer 101, similar to the soft magnetic material layer 102, it is preferable to use an amorphous alloy which is based on Co and added with high melting point metal Nb, Ta, W, or the like. More concretely, specific examples of the Co alloy constituting the pre-coat layer 101 include CoNbZr, CoFeTa and CoWZr.

The type of metal contained in the Co alloy constituting the pre-coat layer 101 may be the same as or different from the type of metal contained in the Co alloy constituting the soft magnetic material layer 102, as long as the saturation magnetization Ms satisfies the above-described relationship.

Here, CoNbZr, which is an example of the Co alloy constituting the pre-coat layer 101 or the soft magnetic material layer 102, has the property that the saturation magnetization Ms increases as the Nb ratio decreases.

In the present embodiment, when CoNbZr is used as the Co alloy constituting the pre-coat layer 101 and as the Co alloy constituting the soft magnetic material layer 102, the Nb ratio in CoNbZr constituting the pre-coat layer 101 is smaller than that in CoNbZr constituting the soft magnetic material layer 102. This makes the saturation magnetization Ms of CoNbZr constituting the pre-coat layer 101 large compared to CoNbZr constituting the soft magnetic material layer 102.

As CoNbZr constituting the pre-coat layer 101, for example, $Co_{80}Nb_{15}Zr_5$ containing 15 at % Nb and 5 at % Zr with the balance of Co (which may be denoted as Co15Nb5Zr, with the saturation magnetization Ms of 790 emu/cc) can be used. As CoNbZr constituting the soft magnetic material layer 102, for example, $Co_{79}Nb_{18}Zr_3$ containing 18 at % Nb and 3 at % Zr with the balance of Co (which may be denoted as Co18Nb3Zr, with the saturation magnetization Ms of 520 emu/cc) can be used.

In addition, as a specific example of the Co alloy constituting the soft magnetic material layer 102, Co1.4Fe5Cr3.6Mn13.8Si9.5B (saturation magnetization of 400 emu/cc) containing 1.4 at % Fe, 5 at % Cr, 3.6 at % Mn, 13.8 at % Si and 9.5 at % B with the balance of Co may be used. When Co1.4Fe5Cr3.6Mn13.8Si9.5B is used as the Co alloy constituting the soft magnetic material layer 102, Co18Nb3Zr, Co17Nb3Zr, etc. can be used as the Co alloy constituting the pre-coat layer 101.

In CoFeCrMnSiB, which is a specific example of the Co alloy constituting the soft magnetic material layer 102, the higher the Fe ratio, or the lower the Cr, Mn, Si, and B ratios, the larger the saturation magnetization Ms. Therefore, when Co1.4Fe5Cr3.6Mn13.8Si9.5B is used as the Co alloy constituting the soft magnetic material layer 102, a CoFeCrMnSiB alloy with the Fe ratio that is large or at least one of the Cr, Mn, Si, and B ratios that is small as compared to Co1.4Fe5Cr3.6Mn13.8Si9.5B can be used as the Co alloy constituting the pre-coat layer 101. The Co alloy constituting the pre-coat layer 101 may be a Co alloy with any one of the Cr, Mn, Si, and B ratios being zero (that is, without containing any one of Cr, Mn, Si, and B).

The thickness of the pre-coat layer 101 is preferably less than or equal to 30% of the thickness of the first soft magnetic material layer 102a, which is the soft magnetic material layer 102 laminated on the pre-coat layer 101, and more preferably less than or equal to 15%. When the thickness of the pre-coat layer 101 is greater than 30% of the thickness of the first soft magnetic material layer 102a, the action to sense the magnetic field or any changes in the magnetic field by the first soft magnetic material layer 102a may be affected. In this case, there is a risk of reducing the sensitivity of the magnetic sensor 1.

In addition, the thickness of the pre-coat layer 101 is preferably greater than or equal to 5 nm, and more preferably greater than or equal to 15 nm. When the thickness of the pre-coat layer 101 is less than 5 nm, the action of the pre-coat layer 101 to reduce the difference in properties between plural magnetic sensors 1 formed using a single substrate 10A (see FIG. 6 below) or between plural sensitive portions 31 in the sensitive element 30 of each magnetic sensor 1 may be insufficient.

Each magnetic domain suppression layer 103 suppresses generation of closure magnetic domains in the corresponding upper and lower soft magnetic material layers 102 sandwiching the magnetic domain suppression layer 103.

As described above, plural magnetic domains having different magnetization directions are often formed in the soft magnetic material layers 102. This leads to formation of closure magnetic domains making an annular magnetization direction. When the closure magnetic domains are formed, a Barkhausen effect takes place when the magnetic domain wall moves as the external magnetic field gets larger, whereby the magnetic domain walls constituting the closure magnetic domains move in a stepwise and discontinuous manner. The discontinuous movements of the magnetic domain walls would produce noise in the magnetic sensor 1, which may reduce the S/N ratio in the output obtained from the magnetic sensor 1.

Each magnetic domain suppression layer 103 suppresses formation of plural magnetic domains with small areas in the corresponding soft magnetic material layers 102 on and under the magnetic domain suppression layer 103. This suppresses formation of the closure magnetic domains, which in turn suppresses the noise that might otherwise be produced from discontinuous movements of the magnetic domain walls. Note that the magnetic domain suppression layers 103 may at least serve to reduce the number of magnetic domains formed, i.e., increase the size of each magnetic domain, as compared to an absence of the magnetic domain suppression layers 103.

Specific examples of materials for these magnetic domain suppression layers 103 include non-magnetic materials, such as Ru and $SiO_2$, and non-magnetic amorphous metals, such as CrTi, AlTi, CrB, CrTa, CoW, and NiP. The magnetic domain suppression layers 103 have a thickness of from 10 nm to 100 nm, for example.

The conductor layer 104 reduces the resistance of the sensitive element 30. Specifically, the conductor layer 104 is more conductive than the soft magnetic material layers 102 and reduces the resistance of the sensitive element 30 as compared to an absence of the conductor layer 104. The magnetic field or any changes in the magnetic field sensed by the sensitive element 30 are measured as a change in the impedance (hereinafter denoted as the impedance Z) when an alternating current is passed between the two terminal portions 33a, 33b. Hereinafter, such a change in the impedance Z is denoted as ΔZ. In this context, a higher frequency of the applied alternating current corresponds to a larger rate of change in the impedance Z relative to the change in the external magnetic field (hereinafter denoted as ΔH). Hereinafter, such a rate of change in the impedance Z relative to ΔH is denoted as an impedance change rate ΔZ/ΔH. However, increasing the frequency of the alternating current in the absence of the conductor layer 104 would instead decrease the impedance change rate ΔZ/ΔH due to the floating capacitance of the magnetic sensor 1. More specifically, assuming that the resistance of the sensitive element 30 is R, the floating capacitance is C, and the sensitive element 30 is a parallel circuit of the resistance R and the floating capacitance C, a relaxation frequency $f_0$ of the magnetic sensor 1 can be expressed by Expression (1) below.

[Expression 1]
$$f_0 = \frac{1}{2\pi RC} \quad (1)$$

As can be understood from Expression (1), a larger floating capacitance C corresponds to a smaller relaxation frequency $f_0$. Thus, if the frequency of the alternating current is higher than the relaxation frequency $f_0$, the impedance change rate ΔZ/ΔH would decrease. To avoid this, the conductor layer 104 is provided to reduce the resistance R of the sensitive element 30 and thereby increase the relaxation frequency $f_0$.

The conductor layer 104 is preferably made of a highly conductive metal or alloy, and more preferably made of a highly conductive and non-magnetic metal or alloy. Specific examples of materials for the conductor layer 104 include metals such as Al, Cu, Ag, and Au. The conductor layer 104 has a thickness of from 10 nm to 1 µm, for example. The conductor layer 104 may at least serve to reduce the resistance of the sensitive element 30 as compared to an absence of the conductor layer 104.

The upper and lower soft magnetic material layers 102 sandwiching the corresponding magnetic domain suppression layer 103 and the upper and lower soft magnetic material layers 102 sandwiching the conductor layer 104 are antiferromagnetically coupled (AFC) with each other. The antiferromagnetic coupling of the lower and upper soft magnetic material layers 102 suppresses a demagnetizing field, helping improve the sensitivity of the magnetic sensor 1.

(Operations of the Sensitive Element 30)

Functions of the sensitive element 30 are now described.

Figure 3:
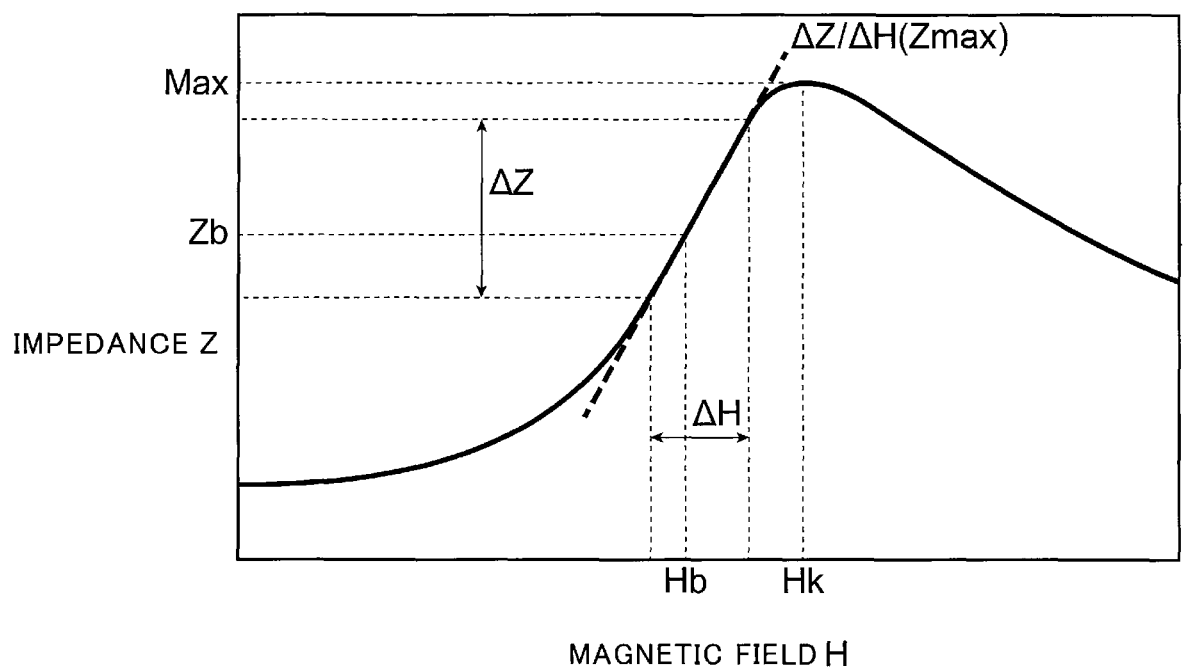
FIG. 3 illustrates relationship between a magnetic field applied in a longitudinal direction of a sensitive portion of a sensitive element and impedance of the sensitive element.

FIG. 3 shows relationship between a magnetic field H applied in the longitudinal direction (the left-right direction in FIG. 1) of the sensitive portion 31 of the sensitive element and the impedance Z of the sensitive element 30. In FIG. 3, the horizontal axis represents the magnetic field H, and the vertical axis represents the impedance Z. Note that the impedance Z is measured by passing an alternating current between the terminal portions 33a, 33b of the sensitive element 30 shown in FIG. 1.

As shown in FIG. 3, the impedance Z of the sensitive element 30 increases with an increase in the magnetic field H applied in the longitudinal direction of the sensitive portion 31. Once the applied magnetic field H becomes larger than an anisotropic magnetic field Hk, the impedance Z of the sensitive element 30 starts to decrease. By use of a portion where the amount of change ΔZ of the impedance Z relative to the amount of change ΔH of the magnetic field H is large, namely a portion where the impedance change rate ΔZ/ΔH is steep (large) within the region where the applied magnetic field H is smaller than the anisotropic magnetic field Hk, a slight change in the magnetic field H can be extracted as the amount of change ΔZ of the impedance Z. In FIG. 3, the center of the portion of the magnetic field H where the impedance change rate ΔZ/ΔH is large is denoted as a magnetic field Hb. That is, the amount of change ΔH in the magnetic field H at or near the magnetic field Hb (in the region shown by a double arrowed line in FIG. 3) can be measured with high accuracy. Here, a value obtained by dividing an amount of impedance change Zmax per unit magnetic field in the portion where the amount of change ΔZ in the impedance Z is steepest (the impedance change rate ΔZ/ΔH is largest), i.e., in the magnetic field Hb, by the impedance Z in the magnetic field Hb (hereinafter denoted as the impedance Zb) is the sensitivity (Zmax/Zb). A higher sensitivity Zmax/Zb produces a larger magnetic impedance effect, which facilitates measurement of the magnetic field or any changes in the magnetic field. In other words, a steeper change in the impedance Z relative to the magnetic field H corresponds to a higher sensitivity Zmax/Zb. In this context, it is preferred that a maximum value MAX of the impedance Z which is a value of the impedance Z in the anisotropic magnetic field Hk and the amount of impedance change Zmax per unit magnetic field in a bias magnetic field Hb be large.

When the magnetic sensor 1 of the present embodiment is used, for example, a magnetic field generated by passing an electric current through a coil is applied as a bias magnetic field so that magnetic fluxes penetrate through the sensitive portions 31 of the sensitive element 30 in the longitudinal direction. Hereinafter, the magnetic field Hb may be denoted as the bias magnetic field Hb.

(Method of Manufacturing a Magnetic Sensor)

In the present embodiment, for example, plural sensitive elements 30 are formed on a disk-shaped substrate 10A (see FIGS. 4A, 6, etc. below), and then the substrate 10A is cut to obtain plural magnetic sensors 1 each having a sensitive element 30. Subsequently, a specific example of a method of manufacturing the magnetic sensor 1 is concretely described. In the following, the disk-shaped substrate 10A before cutting to the individual magnetic sensors 1 may be simply referred to as the substrate 10A.

FIGS. 4A to 4C and 5A to 5C illustrate specific examples of the method of manufacturing the magnetic sensor 1. FIGS. 4A to 4C and 5A to 5C focus on one magnetic sensor 1 manufactured from a single substrate 10A. FIGS. 4A to 4C and 5A to 5C correspond to the cross-sectional view of the magnetic sensor 1 shown in FIG. 2. Note that FIGS. 4A to 4C and 5A to 5C show the representative processes of the method of manufacturing the magnetic sensor 1, which proceed in the order of FIGS. 4A to 4C and 5A to 5C. The method of manufacturing the magnetic sensor 1 may include other processes.

Figure 4A:
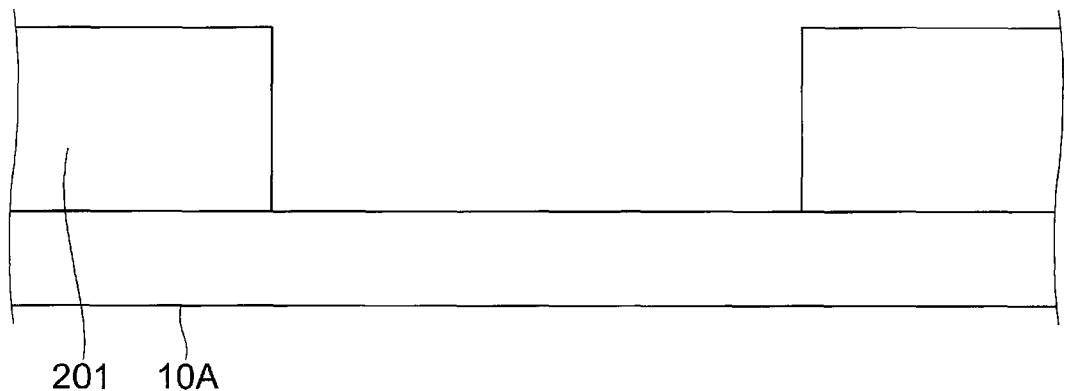
FIGS. 4A to 4C illustrate a specific example of a method of manufacturing the magnetic sensor.

First, as shown in FIG. 4A, a resist pattern 201 is formed on one of the surfaces (hereinafter denoted as the front surface) of the disk-shaped substrate 10A. Specifically, after washing the substrate 10A, a photoresist pattern (a resist pattern) 201, which has a portion where the sensitive element 30 is formed and serves as an opening, is formed by the known photolithography method on the front surface of the substrate 10A.

Figure 6:
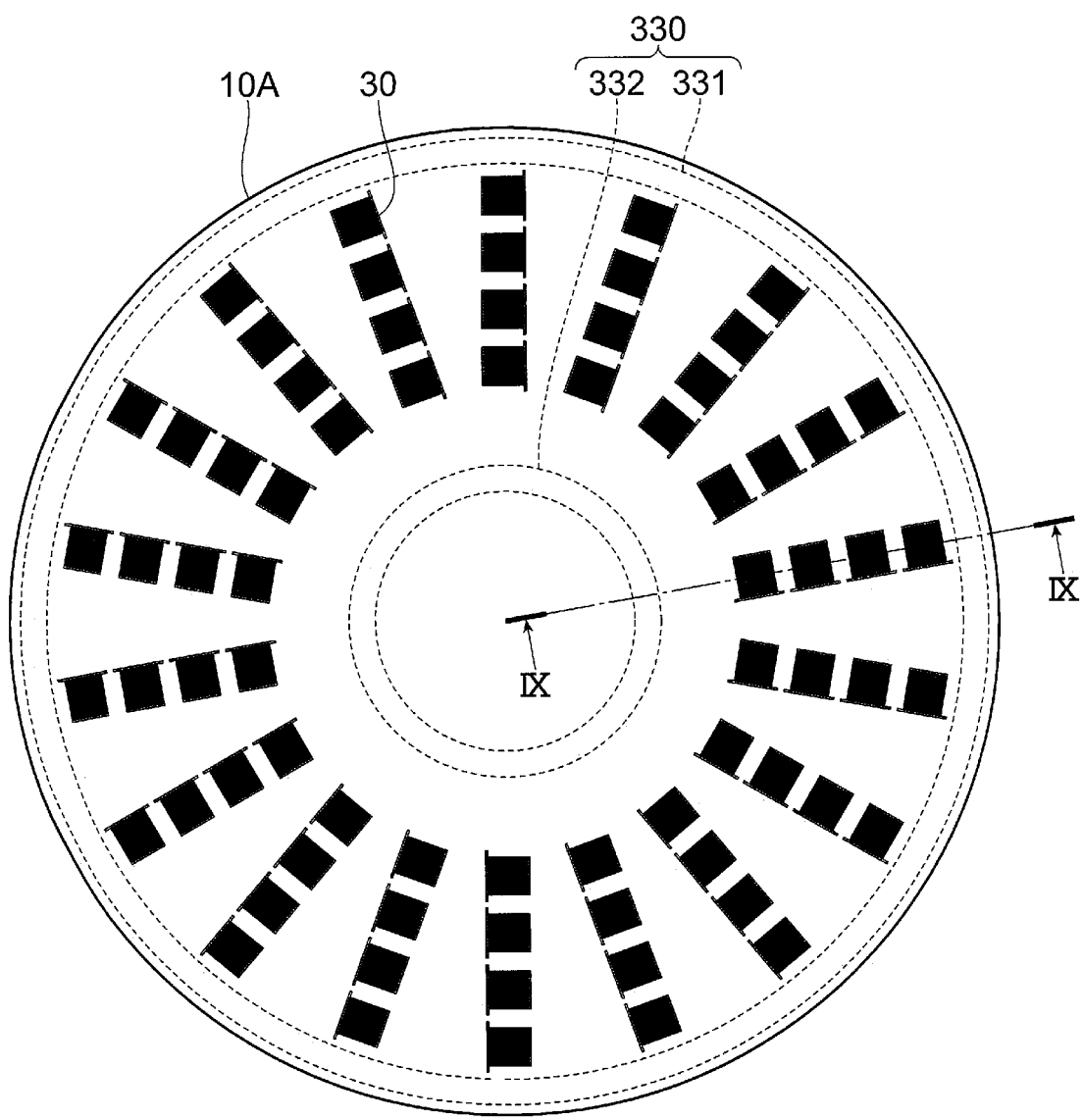
FIG. 6 illustrates a specific example of the arrangement of plural sensitive elements formed on a disk-like substrate.

FIG. 6 illustrates a specific example of arrangement of the plural sensitive elements formed on the disk-like substrate 10A. FIG. 6 shows the positions corresponding to magnets 331 and 332 (see FIG. 7, which will be described later) of the sputtering device 300 (see FIG. 7) when the substrate 10A is disposed in the sputtering device 300 by broken lines.

In the present embodiment, the resist pattern 201 is formed so that the plural sensitive elements 30 are formed in the arrangement shown in FIG. 6 on the substrate 10A. Specifically, as shown in FIG. 6, the resist pattern 201 is formed in such a way that eighteen rows each having four sensitive elements 30 along the radial direction of the disk-shaped substrate 10A are arranged in the circumferential direction of the substrate 10A. In addition, the resist pattern 201 is formed so that the seventy-two sensitive elements 30 are arranged on the disk-shaped substrate 10A. Furthermore, the resist pattern 201 is formed so that the radial direction of substrate 10A is in the transverse direction of each sensitive element 30.

In the specific example shown in FIG. 6, the sensitive elements 30 are not formed in the center of the substrate 10A close to the magnet 332 disposed in the sputtering device 300. In other words, the eighteen sensitive elements 30 formed closest the inner circumference of the plural sensitive elements 30 are located at a predetermined distance away from the center of the disk-shaped substrate 10A.

Next, the substrate 10A having the resist pattern 201 formed thereon is disposed on the sputtering device 300. Then, the sputtering device 300 is used to deposit the pre-coat layer 101, the soft magnetic material layers 102, the magnetic domain suppression layers 103, and the conductor layer 104 on the substrate 10A.

Figure 4B:
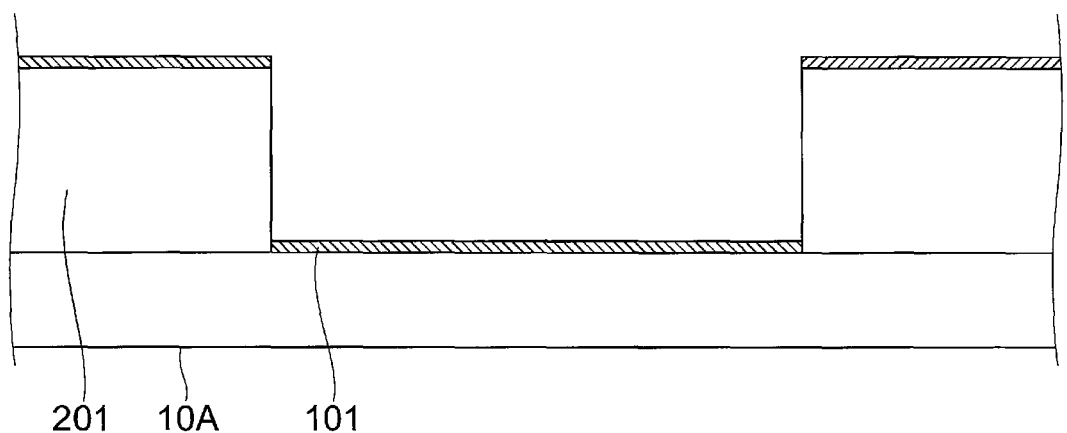

First, as shown in FIG. 4B, the pre-coat layer 101 is deposited on the substrate 10A. Specifically, in the sputtering device 300, the pre-coat layer 101 is deposited on the substrate 10A using a target (a target 322 to be described later) composed of a soft magnetic material. The soft magnetic material has saturation magnetization Ms larger than that of the Co alloy constituting the soft magnetic material layer 102 (the first soft magnetic material layer 102*a*), and the soft magnetic material is the Co alloy constituting the pre-coat layer 101.

The present embodiment deposits the pre-coat layer 101 by magnetron sputtering using the sputtering device 300. This imparts uniaxial magnetic anisotropy in the radial direction of substrate 10A to the Co alloy constituting the pre-coat layer 101.

In the present embodiment, the process of depositing the pre-coat layer 101 by magnetron sputtering using the sputtering device 300 is a specific example of "forming an underlayer."

Figure 4C:
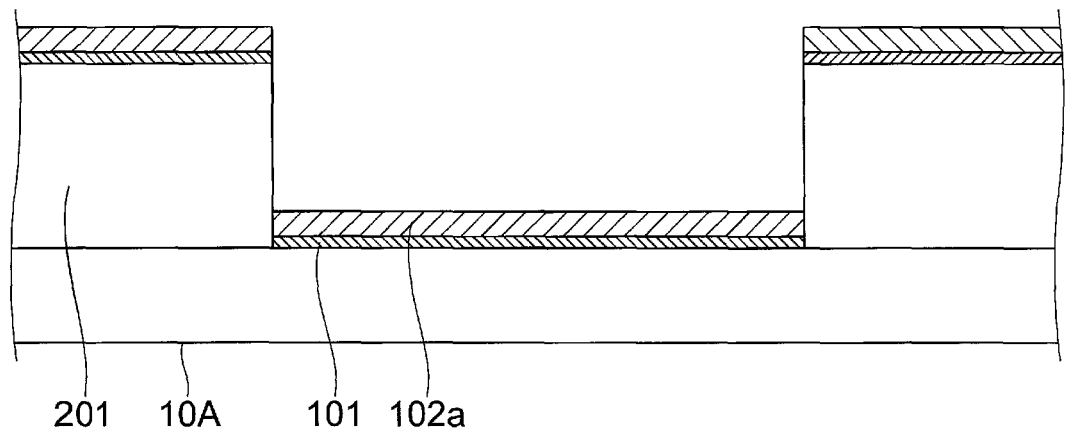

Subsequently, as shown in FIG. 4C, the soft magnetic material layer 102 (the first soft magnetic material layer 102*a*) is deposited on the pre-coat layer 101 formed on the substrate 10A. Specifically, in the sputtering device 300, the first soft magnetic material layer 102*a* is deposited on the pre-coat layer 101 using the target 322 composed of the soft magnetic material. In addition, the first soft magnetic material layer 102*a* is deposited using the target 322, which is composed of a soft magnetic material with small saturation magnetization Ms compared to the soft magnetic material constituting the pre-coat layer 101. Note that the soft magnetic material is the above-described Co alloy constituting the soft magnetic material layer 102.

The present embodiment deposits the first soft magnetic material layer 102*a* by magnetron sputtering using the sputtering device 300. This imparts uniaxial magnetic anisotropy in the radial direction of the substrate 10A to the Co alloy constituting the first soft magnetic material layer 102*a*.

In the present embodiment, the process of depositing the first soft magnetic material layer 102*a* by magnetron sputtering using the sputtering device 300 is a specific example of "forming a soft magnetic material layer."

Figure 5A:
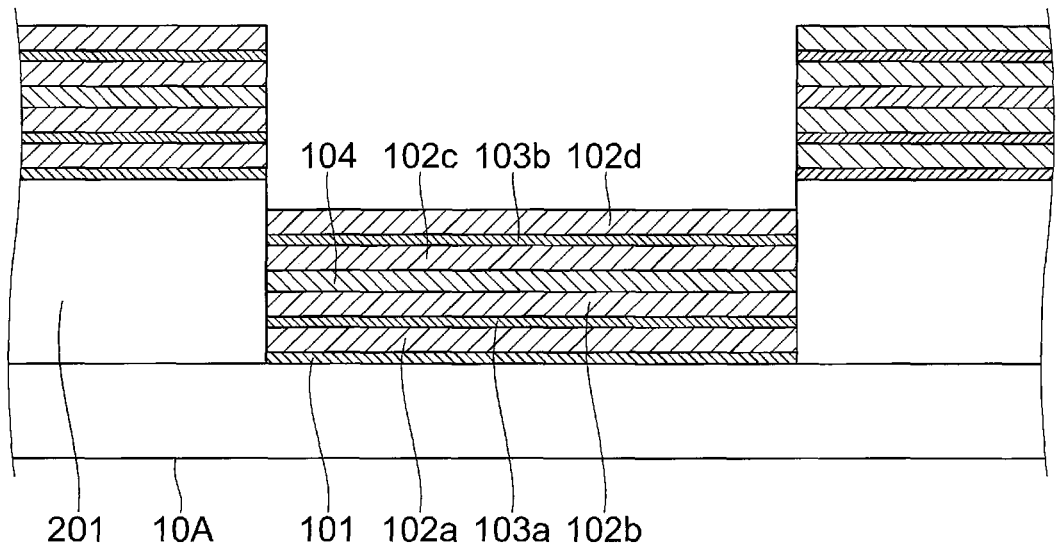
FIGS. 5A to 5C illustrate another specific example of a method of manufacturing the magnetic sensor.

Subsequently, on the soft magnetic material layer 102*a*, the first magnetic domain suppression layer 103*a*, the second soft magnetic material layer 102*b*, the conductor layer 104, the third soft magnetic material layer 102*c*, the second magnetic domain suppression layer 103*b*, and the fourth soft magnetic material layer 102*d* are deposited in this order using the sputtering device 300, as shown in FIG. 5A.

In the present embodiment, similar to the first soft magnetic material layer 102*a*, the second soft magnetic material layer 102*b*, the third soft magnetic material layer 102*c*, and the fourth soft magnetic material layer 102*d* are deposited by magnetron sputtering using the sputtering device 300; accordingly, the uniaxial magnetic anisotropy in the radial direction of the substrate 10A is imparted to the Co alloy constituting the second soft magnetic material layer 102*b*, the third soft magnetic material layer 102*c*, and the fourth soft magnetic material layer 102*d*.

Figure 5B:
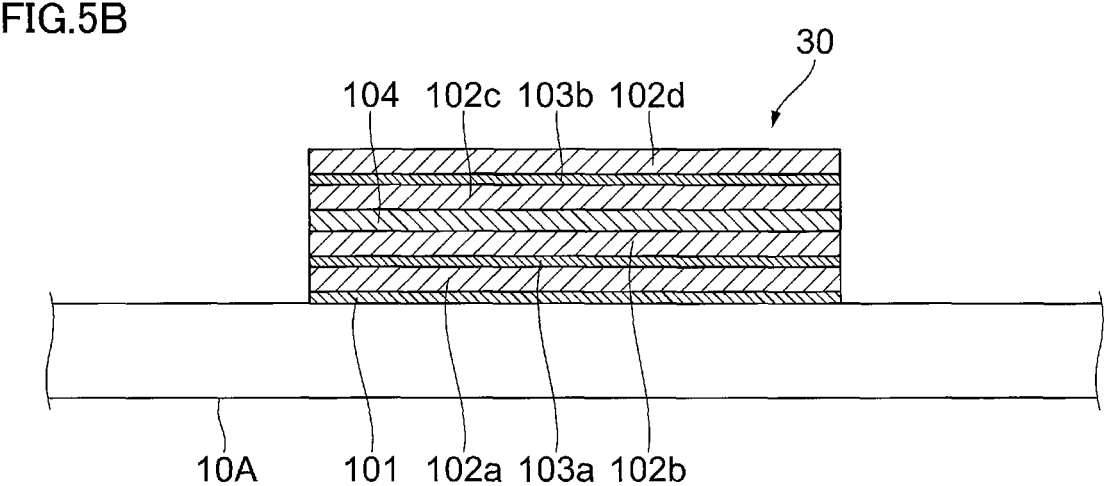

Then, as shown in FIG. 5B, the resist pattern 201 is removed, and the pre-coat layer 101, the soft magnetic material layers 102 (the first soft magnetic material layer 102*a*, the second soft magnetic material layer 102*b*, the third soft magnetic material layer 102*c*, the fourth soft magnetic material layer 102*d*), the magnetic domain suppression layers 103 (the first magnetic domain suppression layer 103*a*, the second magnetic domain suppression layer 103*b*), and the conductor layer 104 on the resist pattern 201 are also removed (lifted-off).

Thus, the plural sensitive elements 30 composed of the pre-coat layer 101, the soft magnetic material layers 102 (the first soft magnetic material layer 102*a*, the second soft magnetic material layer 102*b*, the third soft magnetic material layer 102c, the fourth soft magnetic material layer 102d), the magnetic domain suppression layers 103 (the first magnetic domain suppression layer 103a, the second magnetic domain suppression layer 103b), and the conductor layer 104 are formed on the substrate 10A. In addition, a sensitive element assembly with plural sensitive elements 30 formed on the substrate 10A is obtained. The front surface of the substrate 10A is exposed between the sensitive elements 30.

In the present embodiment, the process of removing the resist pattern 201 and each layer on the resist pattern 201 to form the sensitive elements 30 is a specific example of "forming a plurality of sensitive elements."

Figure 5C:
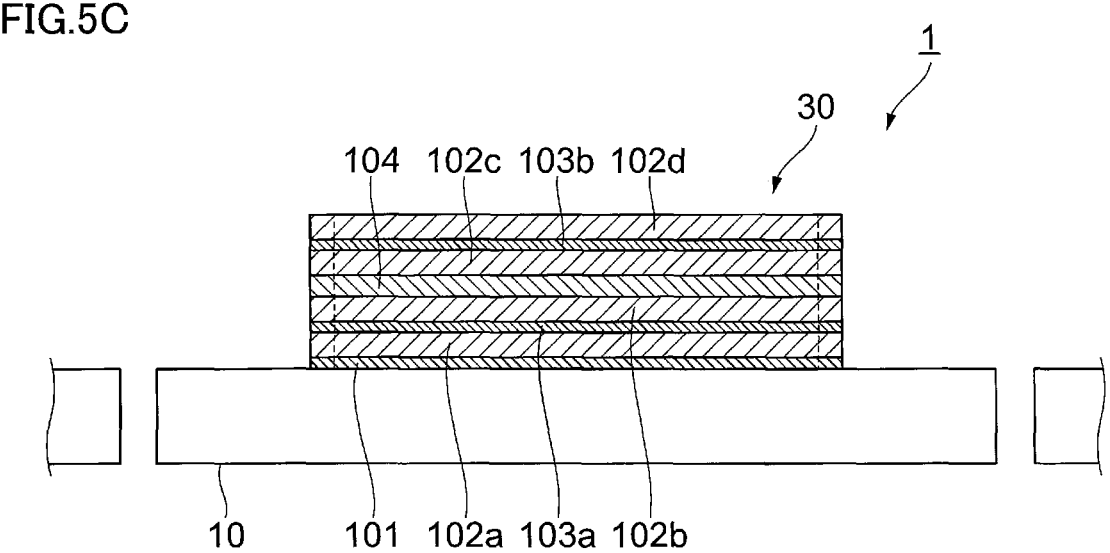

Subsequently, as shown in FIG. 5C, by dividing (cutting) the substrate 10A in the sensitive element assembly where plural sensitive elements 30 are formed on the substrate (see FIG. 5B), the individual magnetic sensors 1 each including the sensitive element 30 on the substrate 10 are formed.

Specifically, the substrate 10A exposed between the sensitive elements 30 is cut so that the obtained magnetic sensor 1 has a quadrangular planar shape. The cutting (division) of the substrate 10A can be performed by a dicing method, a laser cutting method, etc.

According to the above processes, the plural magnetic sensors 1 each having the sensitive element 30 can be obtained from the single substrate 10A.

In the present embodiment, as described above, the uniaxial magnetic anisotropy is imparted to the pre-coat layer 101 and the soft magnetic material layers 102 (the first soft magnetic material layer 102a, the second soft magnetic material layer 102b, the third soft magnetic material layer 102c, the fourth soft magnetic material layer 102d) by the magnetron sputtering. In the magnetron sputtering, the magnets (magnets 331, 332 to be described later) are used to form the magnetic field, and the uniaxial magnetic anisotropy is imparted to each of the pre-coat layer 101 and the soft magnetic material layers 102 simultaneously with the deposition of the pre-coat layer 101 and the soft magnetic material layers 102. This eliminates, for example, the need for the process of imparting the uniaxial magnetic anisotropy performed in heat treatment in the rotating magnetic field and heat treatment in the static magnetic field subsequent thereto after formation of the sensitive elements 30, to thereby make it possible to simplify the manufacturing process.

Note that, in the above manufacturing method of the magnetic sensor 1, the plural sensitive elements 30 were formed on the substrate 10A by the lift-off method using the resist pattern 201, but other methods may be adopted. For example, after depositing each layer constituting the sensitive element 30 on the substrate 10A, plural sensitive elements 30 may be formed by etching.

By the way, when the plural magnetic sensors 1 are obtained using a single substrate 10A, if the soft magnetic material layer 102 is deposited directly on the front surface of the substrate 10A by the magnetron sputtering, there may be a difference in the properties of the obtained magnetic sensors 1 due to the difference in the positions of the magnetic sensors 1 on the substrate 10A. In addition, in each of the obtained magnetic sensors 1, there may be a difference in the properties of the plural sensitive portions 31 of each magnetic sensor 1 due to the difference in positions on the substrate 10A. Though details will be described later, this is presumed because the magnetic field generated on the front surface of substrate 10A when performing the magnetron sputtering differs in magnitude depending on the position on the substrate 10A.

For example, when the plural magnetic sensors 1 are obtained using the disk-shaped substrate 10A, as the magnetic sensor 1 includes the sensitive element 30 formed closer to the outer circumference of the substrate 10A, the maximum value Max of the impedance Z, which is a value of the impedance Z in the anisotropic magnetic field Hk, the bias magnetic field Hb, and the amount of impedance change Zmax per unit magnetic field in the bias magnetic field Hb tend to be smaller. Therefore, there may be a difference in the sensitivity of measuring the magnetic field or any changes in the magnetic field between the magnetic sensor 1 with the sensitive element 30 located closer to the inner circumference of the substrate 10A and the magnetic sensor 1 with the sensitive element 30 formed closer to the outer circumference of the substrate 10A.

In contrast thereto, in the present embodiment, the pre-coat layer 101, which is composed of the soft magnetic material with the saturation magnetization Ms higher than that of the soft magnetic material constituting the soft magnetic material layer 102, is disposed between the substrate 10 (substrate 10A) and the soft magnetic material layer 102. This reduces the difference in properties in the plural magnetic sensors 1 obtained from the single substrate 10A, or plural sensitive portions 31 in the magnetic sensor 1.

Subsequently, together with the configuration of the sputtering device 300 used for depositing each layer of the sensitive element 30, the action by the pre-coat layer 101 in the present embodiment is described in detail.

Figure 7:
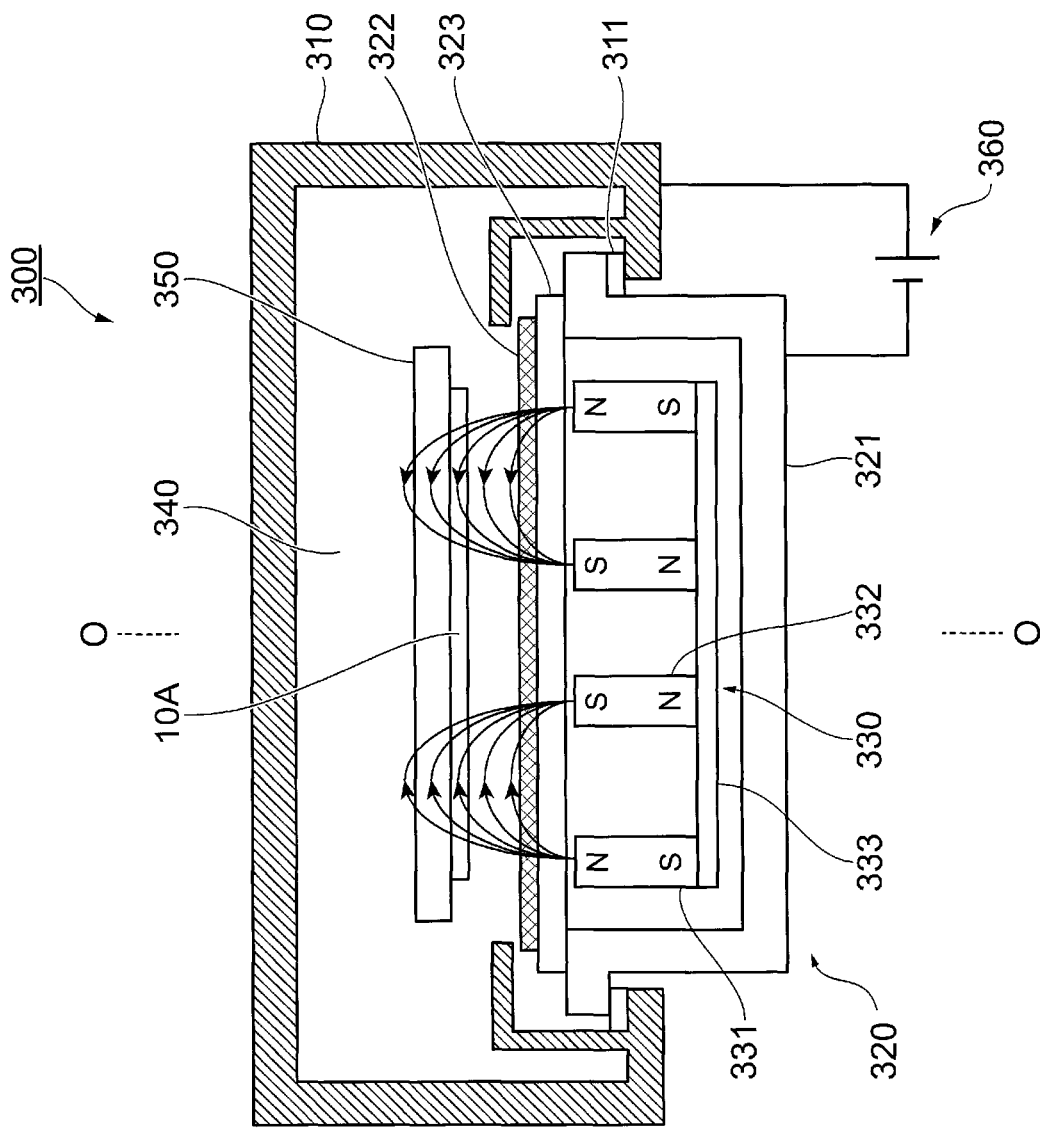
FIG. 7 illustrates a specific example of a configuration of a sputtering device used for depositing each layer.

FIG. 7 illustrates a specific example of the configuration of the sputtering device 300 used for depositing each layer. The sputtering device 300 shown in FIG. 7 has a cylindrical shape with the line O-O in FIG. 7 as an axis.

The sputtering device 300 is of a magnetron type. The sputtering device 300 includes a partition wall 310 and a magnetron cathode 320, as shown in FIG. 7. The partition wall 310 and the magnetron cathode 320 constitute a chamber 340, which is sealed space, via an insulation member 311 composed of polytetrafluoroethylene, etc.

The sputtering device 300 includes, in the chamber 340, a substrate holder 350 holding the substrate 10A.

The partition wall 310 is grounded (GND). The substrate holder 350 is grounded (GND) via the partition wall 310, to thereby function as an anode. In other words, a DC power supply 360 applying a direct current is connected between the grounded substrate holder 350 and the magnetron cathode 320. Note that a high-frequency power supply may be connected in place of the DC power supply 360 to allow a high-frequency current to be applied between the substrate holder 350 and the magnetron cathode 320.

Though illustration is omitted, the sputtering device 300 includes a vacuum pump that reduces the pressure in the chamber 340, a gas supply mechanism that supplies gas used for sputtering, such as Ar, into the chamber 340, and a pressure adjustment mechanism that keeps the pressure in the chamber 340 at a predetermined value. In addition, for cooling the magnetron cathode 320, the sputtering device 300 may include a cooling mechanism that supplies a cooling liquid to the magnetron cathode 320. The sputtering device 300 may further include a heating mechanism such as an infrared lamp for heating the substrate 10A, or conversely, a cooling mechanism that supplies a cooling liquid to the substrate holder 350 for cooling the substrate 10A.

The substrate holder 350 is composed of stainless steel, etc. The substrate holder 350 then holds the substrate 10A so that the front surface of the substrate 10A faces the target 322, which will be described later, of the magnetron cathode 320.

The magnetron cathode 320 includes: a cathode housing 321; the target 322; a backing plate 323 that holds the target 322; and a magnetic circuit 330 that causes a magnetic field to pass through the backing plate 323 to be generated closer to the target 322.

The target 322 is the material of each layer to be formed on the substrate 10A. Similar to the substrate 10A, the target 322 is disk-shaped. The size (diameter) of the target 322 is set so that each layer is deposited within a predetermined region (scope) of the substrate 10A. Here, the diameter of the target 322 is set larger than the diameter of the substrate 10A.

The backing plate 323 is composed of highly conductive oxygen-free copper, etc. The target 322 is then secured to the surface of the backing plate 323 with a conductive adhesive agent, etc.

The cathode housing 321 is composed of stainless steel, etc.

In the magnetron cathode 320, the backing plate 323 with the target 322 attached is secured to the cathode housing 321. The magnetic circuit 330 is disposed on a side of the backing plate 323, where the target 322 is not provided.

The magnetic circuit 330 includes: a magnet 331 whose N pole is exposed toward the backing plate 323; a magnet 332 whose S pole is exposed toward the backing plate 323; and a yoke 333 disposed on a side of the magnets 331 and 332 opposite to a side closer to the backing plate 323, the yoke 333 guiding a magnetic flux from the N pole of the magnet 332 to the S pole of the magnet 331. Generally, a permanent magnet is used for the magnets 331 and 332.

Here, the magnets 331 and 332 are concentrically disposed so that the magnet 331 whose N pole is exposed toward the backing plate 323 is located closer to the outer circumference, and the magnet 332 whose S pole is exposed toward the backing plate 332 is located closer to the inner circumference.

In the magnetic circuit 330, the above arrangement of the magnets 331 and 332 causes the magnetic field lines (indicated by the arrows in FIG. 7) from the N pole of the magnet 331 to the S pole of the magnet 332 to penetrate through the backing plate 323 and the target 322, and to be generated in the chamber 340. Part of the magnetic field lines reaches the substrate 10A held by the substrate holder 350 and passes through the substrate 10A in the direction parallel to the front surface. That is, in the substrate 10A, in a portion where the magnetic field lines pass through, a magnetic field parallel to the front surface is generated. In addition, the magnetic field lines pass through the surface of substrate 10A from the outer circumference side to the inner circumference side thereof along the radial direction of the substrate 10A. On the surface of the substrate 10A, the magnetic field lines generate a magnetic field from the outer circumference side to the inner circumference side of the substrate 10A along the radial direction of the substrate 10A.

The magnetic field generated on the surface of the substrate 10A imparts the uniaxial magnetic anisotropy to each layer (in this specific example, the pre-coat layer 101 and the soft magnetic material layers 102 composed of the soft magnetic material) deposited on the substrate 10A. In addition, each layer deposited on the substrate 10A (the pre-coat layer 101 and the soft magnetic material layers 102) deposited on substrate 10A is imparted with the uniaxial magnetic anisotropy in the radial direction of the substrate 10A along the magnetic field generated on the surface of the substrate 10A.

The sputtering device 300 concentrates (confines) electrons generated by discharge caused by the DC power supply 360 at or near the target 322 by the magnetic field lines on the surface of the target 322. This increases collision probability of electrons and gases to accelerate ionization of gases, to thereby improve deposition rate of films. Note that the surface of the target 322 where the electrons are concentrated by the magnetic field lines becomes a scope to be eroded by collision of ions of the ionized gases.

As described above, the sputtering device 300 shown in FIG. 7 is a sheet-fed type sputtering device that forms a film on each substrate 10A.

The sputtering device 300 shown in FIG. 7 disposed the surface of the substrate 10A and the surface of the target 322 horizontally (in the left-right direction in FIG. 7), but these surfaces may be disposed vertically (in the up-down direction in FIG. 7).

Next, the relationship between the magnetic field lines generated by the magnetic circuit 330 and passing through the surface of the substrate 10A and the soft magnetic material layer 102 (the first soft magnetic material layer 102a) deposited on substrate 10A is described.

Figure 8:
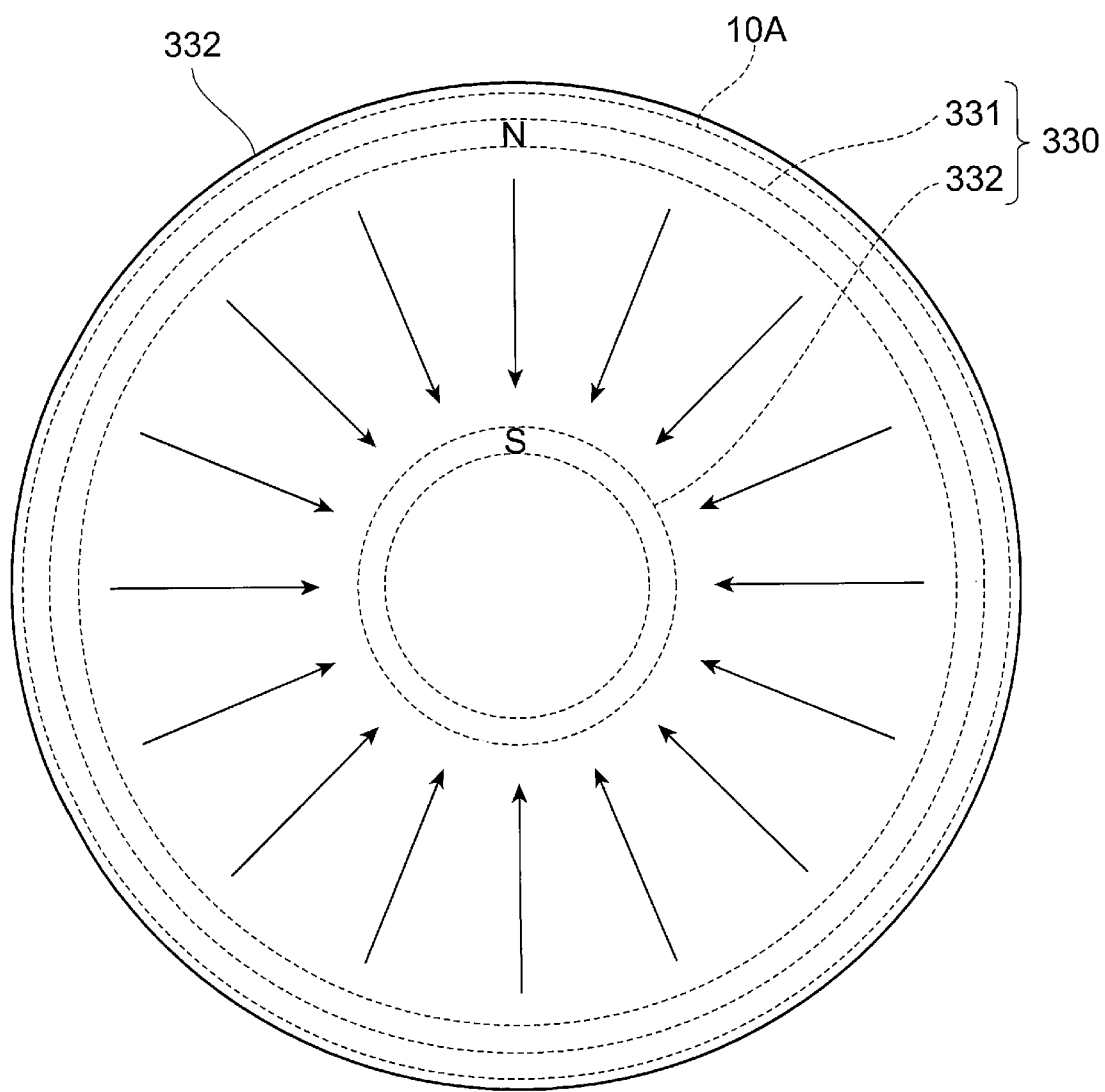
FIG. 8 illustrates a configuration of a magnetic circuit in the sputtering device.

FIG. 8 illustrates a configuration of the magnetic circuit 330 in the sputtering device 300. FIG. 8 shows the configuration of the magnetic circuit 330 viewed from the target 322.

Figure 9A:
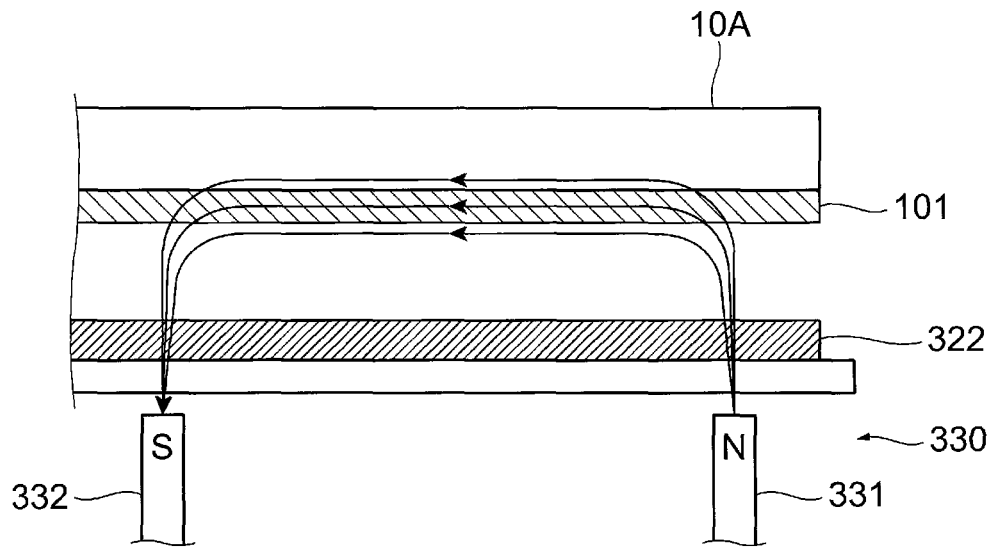
FIGS. 9A and 9B each illustrate a specific example of a state of magnetic force lines generated by a magnetic circuit and passing through the surface of the substrate when the soft magnetic material layers are deposited in the sputtering device.
Figure 9B:
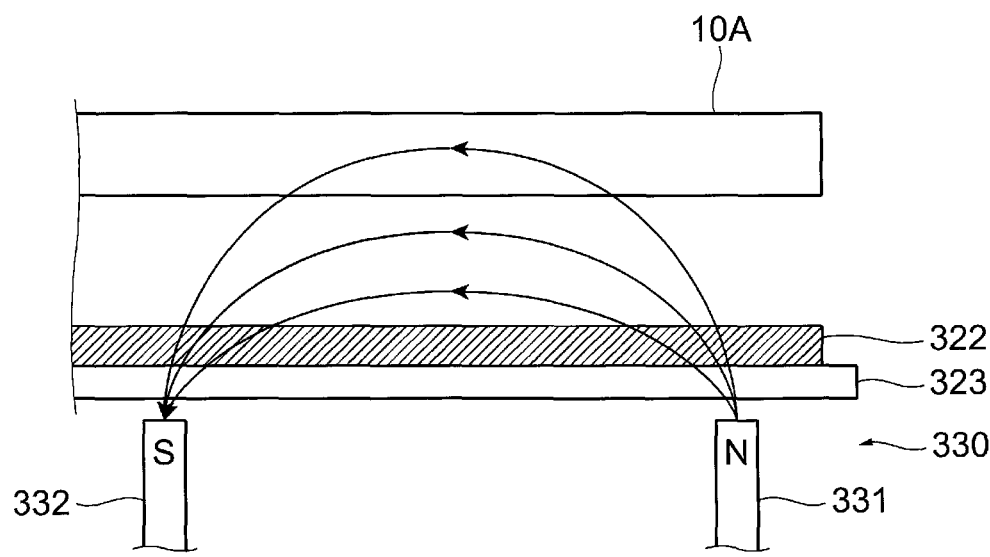

FIGS. 9A and 9B illustrate a specific example of a state of magnetic force lines generated by the magnetic circuit 300 and passing through the surface of the substrate 10A when the soft magnetic material layer 102 (the first soft magnetic material layer 102a) is deposited in the sputtering device 300. FIGS. 9A and 9B correspond to the cross-sectional view taken along the line IX-IX in the substrate 10A shown in FIG. 6. FIG. 9A illustrates the state of the magnetic field lines when the pre-coat layer 101 is laminated on the substrate 10A and then the soft magnetic material layer 102 (the first soft magnetic material layer 102a) is laminated on the pre-coat layer 101 based on the above-described manufacturing method of the present embodiment. FIG. 9B illustrates the state of the magnetic field lines when the soft magnetic material layer 102 (the first soft magnetic material layer 102a) is laminated directly on the substrate 10A without laminating the pre-coat layer 101. FIGS. 9A and 9B show the magnetic force lines with arrows.

As described above, in the chamber 340 (see FIG. 7), the magnetic circuit 330 (see FIG. 7) generates magnetic field lines from the N pole of the magnet 331 disposed closer to the outer circumference of the substrate 10A to the S pole of the magnet 332 disposed closer to the inner circumference of the substrate 10A. Thus, as shown in FIG. 8, a magnetic field from the outer circumference side to the inner circumference side of the substrate 10A is generated on the surface of the substrate 10A.

Here, when the first soft magnetic material layer 102a is laminated directly on the substrate 10A without laminating the pre-coat layer 101, the magnetic field lines generated by the magnetic circuit 330 tend to pass the location away from the surface of the substrate 10A at the inner and outer circumference sides of the substrate 10A.

Specifically, as shown in FIG. 9B, the magnetic field lines from the N pole of the magnet 331 to the S pole of the magnet 332 pass along the surface of substrate 10A in the middle region in the radial direction of the substrate 10A, the middle region being located between the magnet 331 and the magnet 332. On the other hand, also as shown in FIG. 9B, the magnetic field lines from the N pole of the magnet 331 to the S pole of the magnet 332 pass the location away from the surface of the substrate 10A at the outer circumference side of the substrate 10A closer to the magnet 331 and at the inner circumference side of the substrate closer to the magnet 332. Consequently, at the inner circumference side and the outer circumference side of the substrate 10A, the magnetic field along the radial direction of the substrate 10A tends to be small as compared to the middle region in the radial direction of the substrate 10A.

As described above, when the soft magnetic material layer 102 (the first soft magnetic material layer 102a) is deposited by magnetron sputtering using the sputtering device 300, the magnetic field, which is generated by the magnetic circuit 330, along the radial direction of the substrate 10A imparts the uniaxial magnetic anisotropy to the first soft magnetic material layer 102a. Therefore, if the magnetic field generated in the substrate 10A is small, the uniaxial magnetic anisotropy imparted to the first soft magnetic material layer 102a tends to be small.

When the sensitive elements 30 are arranged on the substrate 10A as shown in FIG. 6, if the first soft magnetic material layer 102a is laminated directly on the substrate 10A without laminating the pre-coat layer 101, the uniaxial magnetic anisotropy of the first soft magnetic material layer 102a constituting the sensitive element 30 decreases as moving toward the outer circumference of the substrate 10A where the magnetic field generated is small.

As a result, in the magnetic sensor 1 including the sensitive element 30 formed closer to the outer circumference of the substrate 10A, from among the plural magnetic sensors 1 obtained by dividing the substrate 10A, the maximum value Max of the impedance Z in the anisotropic magnetic field Hk, the bias magnetic field Hb, and the amount of impedance change Zmax per unit magnetic field in the bias magnetic field Hb tend to be smaller. In this case, the sensitivity of the sensitive element 30 to sense the magnetic field or any changes in the magnetic easily decreases.

In the specific example shown in FIG. 6, the sensitive elements 30 are not formed in the center of the substrate 10A, as described above. For this reason, it is unlikely that the sensitivity of the sensitive element 30 will decrease due to the reduction in the magnetic field at the inner circumference side of the substrate 10A, which is close to the magnet 332.

Focusing on the individual magnetic sensors 1, in the sensitive portion 31 disposed closer to the outer circumference of the substrate 10A, from among the plural sensitive portions 31 of each sensitive element 30, the maximum value Max of the impedance Z in the anisotropic magnetic field Hk, the bias magnetic field Hb, and the amount of impedance change Zmax per unit magnetic field in the bias magnetic field Hb tend to be smaller. If a difference in the magnetic properties occurs between the plural sensitive portions 31 constituting the sensitive element 30 in the individual magnetic sensor 1, the sensitivity of the magnetic sensor 1 as a whole to sense the magnetic field or any changes in the magnetic field by the sensitive element 30 tends to decrease, which is undesirable.

In contrast, in the present embodiment, the lamination of the pre-coat layer 101 on the substrate 10A and the lamination of the first soft magnetic material layer 102a on the pre-coat layer 101 causes the magnetic force lines generated by the magnetic circuit 330 to easily pass along the surface of the substrate 10A.

Specifically, if the pre-coat layer 101 exists on the substrate 10A as shown in FIG. 9A, the magnetic field lines from the N pole of the magnet 331 to the S pole of the magnet 332 pass inside the pre-coat layer 101. The magnetic field lines from the N pole of the magnet 331 to the S pole of the magnet 332 easily pass along the surface of substrate 10A at or near the substrate 10A entirely from the outer circumference to the inner circumference of the substrate 10A. In the present embodiment, this suppresses the reduction of the magnetic field along the radial direction of the substrate 10A at the outer circumference and inner circumference of the substrate 10A as compared to the case where the pre-coat layer 101 is not laminated on the substrate 10A. In addition, in the present embodiment, the difference in intensity of the magnetic field due to the difference in the position in the radial direction of the substrate 10A is reduced as compared to the case where the pre-coat layer 101 is not laminated on the substrate 10A.

Then, when the sensitive elements 30 are arranged on the substrate 10A as shown in FIG. 6, in the present embodiment, decrease of the uniaxial magnetic anisotropy, which is imparted to the first soft magnetic material layer 102a laminated on the pre-coat layer 101, at the outer circumference of the substrate 10A can be suppressed.

As a result, in the magnetic sensor 1 including the sensitive element 30 formed closer to the outer circumference of the substrate 10A, from among the plural magnetic sensors 1 obtained by dividing the substrate 10A, reduction in the maximum value Max of the impedance Z in the anisotropic magnetic field Hk, the bias magnetic field Hb, and the amount of impedance change Zmax per unit magnetic field in the bias magnetic field Hb can be suppressed. Consequently, in the plural magnetic sensors 1 obtained by dividing the substrate the difference in magnetic properties due to the difference in the position of the sensitive element 30 in the substrate 10A is less likely to occur.

In addition, in the individual magnetic sensor 1, the difference in the magnetic properties is prevented from occurring between the plural sensitive portions 31 constituting the sensitive element 30, and the decrease in the sensitivity to sense the magnetic field or any changes in the magnetic field by the sensitive element 30 is suppressed in each magnetic sensor 1.

(Modifications)

A modification of the magnetic sensor 1 is now described.

Figure 10:
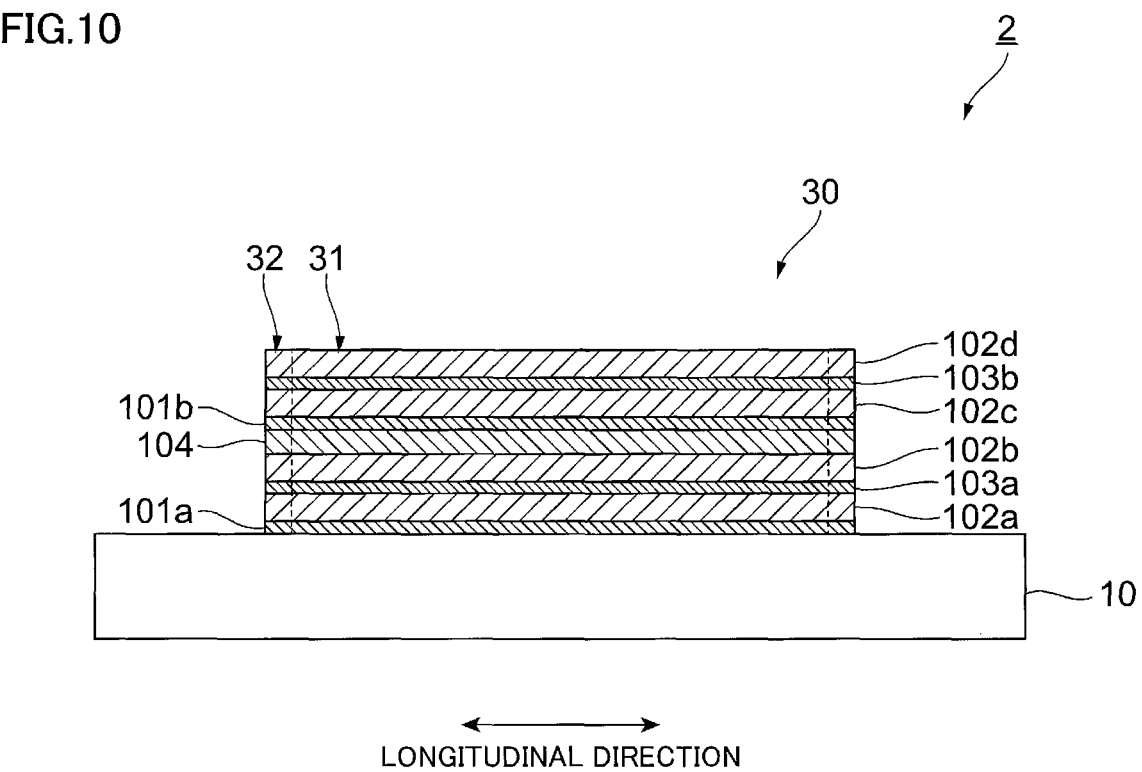
FIG. 10 is a cross-sectional view of a magnetic sensor that is a modification.

FIG. 10 is a cross-sectional view of a magnetic sensor 2, which is a modification of the magnetic sensor 1. FIG. 10 corresponds to the cross-sectional view taken along the line II-II in FIG. 1. In the magnetic sensor 2 shown in FIG. 10, the same reference signs are used for the same configurations as the magnetic sensor 1 shown in FIGS. 1, 2, etc., and detailed description is omitted here.

Specifically, similar to the magnetic sensor 1, the sensitive element 30 of the magnetic sensor 2 includes the soft magnetic material layers 102 (the first soft magnetic material layer 102a, the second soft magnetic material layer 102b, the third soft magnetic material layer 102c, the fourth soft magnetic material layer 102d), the magnetic domain suppression layers 103 (the first magnetic domain suppression layer 103a, the second magnetic domain suppression layer 103b), and the conductor layer 104. The sensitive element 30 of the magnetic sensor 2 also includes, between the substrate 10 and the first soft magnetic material layer 102a, a first pre-coat layer 101a composed of a soft magnetic material whose saturation magnetization Ms is large compared to the soft magnetic material that constitutes the soft magnetic material layers 102. The sensitive element 30 of the magnetic sensor 2 further includes, between the conductor layer 104 and the third soft magnetic material layer 102c, a second pre-coat layer 101b composed of a soft magnetic material whose saturation magnetization Ms is large compared to the soft magnetic material that constitutes the soft magnetic material layers 102. Hereinafter, the first pre-coat layer 101a and the second pre-coat layer 101b are referred to as the pre-coat layers 101 unless the distinction is necessary.

The magnetic sensor 2 differs from the magnetic sensor 1 in the point that it has a pre-coat layer 101 between the conductor layer 104 and the third soft magnetic layer 102c, in addition to the substrate 10 and the first soft magnetic layer 102a.

In the magnetic sensor 2, the second pre-coat layer 101b is formed on the conductor layer 104, and thereby, when the third soft magnetic material layer 102c is laminated on the second pre-coat layer 101b in the manufacturing process of the magnetic sensor 2, the magnetic force lines from the N pole of the magnet 331 to the S pole of the magnet 332 pass inside the second pre-coat layer 101b. This suppresses occurrence of the difference in the uniaxial magnetic anisotropy imparted to the third soft magnetic material layer 102c, which is laminated on the second pre-coat layer 101b, depending on the position on the substrate 10A (see FIG. 6, etc.). As compared to the case where the second pre-coat layer 101b is not formed, in the plural magnetic sensors 2 obtained by dividing the substrate 10A, the difference in magnetic properties due to the difference in the position of the sensitive element in the substrate 10A is less likely to occur.

Similar to the above embodiment, the thickness of the first pre-coat layer 101a is preferably less than or equal to 30% of the thickness of the first soft magnetic material layer 102a laminated on the first pre-coat layer 101a, and more preferably less than or equal to 15%. The thickness of the second pre-coat layer 101b is preferably less than or equal to 30% of the thickness of the third soft magnetic material layer 102c laminated on the second pre-coat layer 101b, and more preferably less than or equal to 15%.

In addition, when the sensitive element 30 includes the plural pre-coat layers 101, the thickness of each pre-coat layer 101 is preferably less than or equal to 30% of the thickness of the soft magnetic material layer, which is laminated on the pre-coat layer 101, and more preferably less than or equal to 15%. When the thickness of each pre-coat layer 101 is greater than 30% of the thickness of the soft magnetic material layer 102, which is laminated on the pre-coat layer 101, the action to sense the magnetic field or any changes in the magnetic field by the soft magnetic material layer 102 may be affected. In this case, there is a risk of reducing the sensitivity of the magnetic sensor 1.

The thickness of each of the first pre-coat layer 101a and the second pre-coat layer 101b is preferably greater than or equal to 5 nm, and more preferably greater than or equal to 15 nm.

In addition, when the sensitive element 30 includes the plural pre-coat layers 101, the thickness of each pre-coat layer 101 is preferably greater than or equal to 5 nm, and more preferably greater than or equal to 15 nm. When the thickness of each pre-coat layer 101 is less than 5 nm, the action of the pre-coat layer 101 to reduce the difference in properties between plural magnetic sensors 1 formed using a single substrate 10A or between plural sensitive portions 31 in the sensitive element 30 of each magnetic sensor 1 may be insufficient.

Figure 11A:
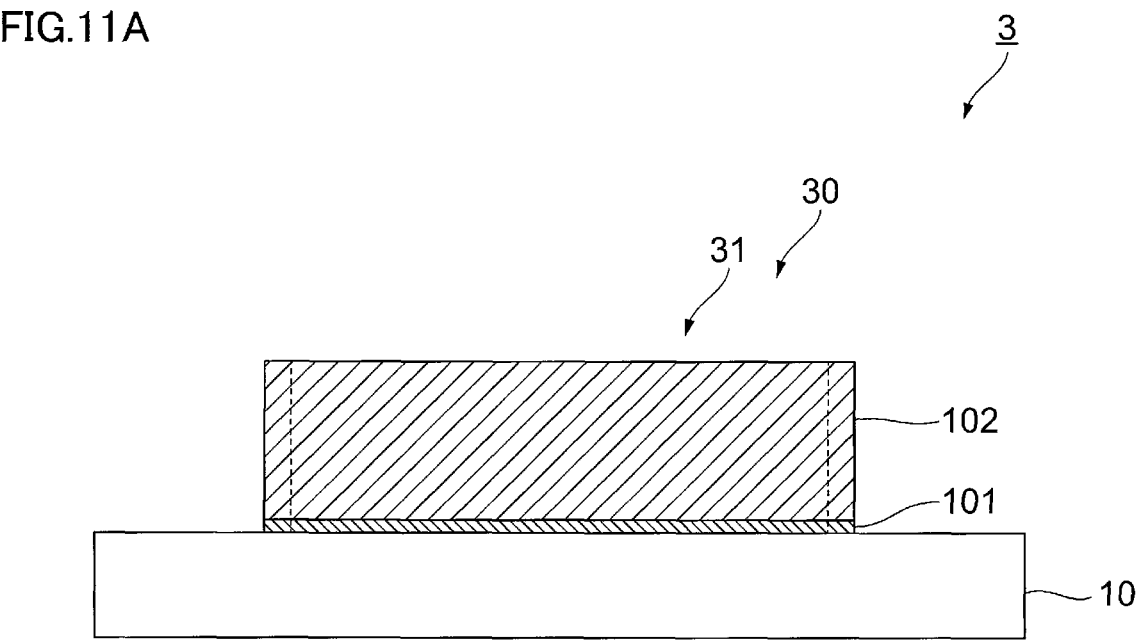
FIGS. 11A and 11B are cross-sectional views of magnetic sensors that are other modifications.
Figure 11B:
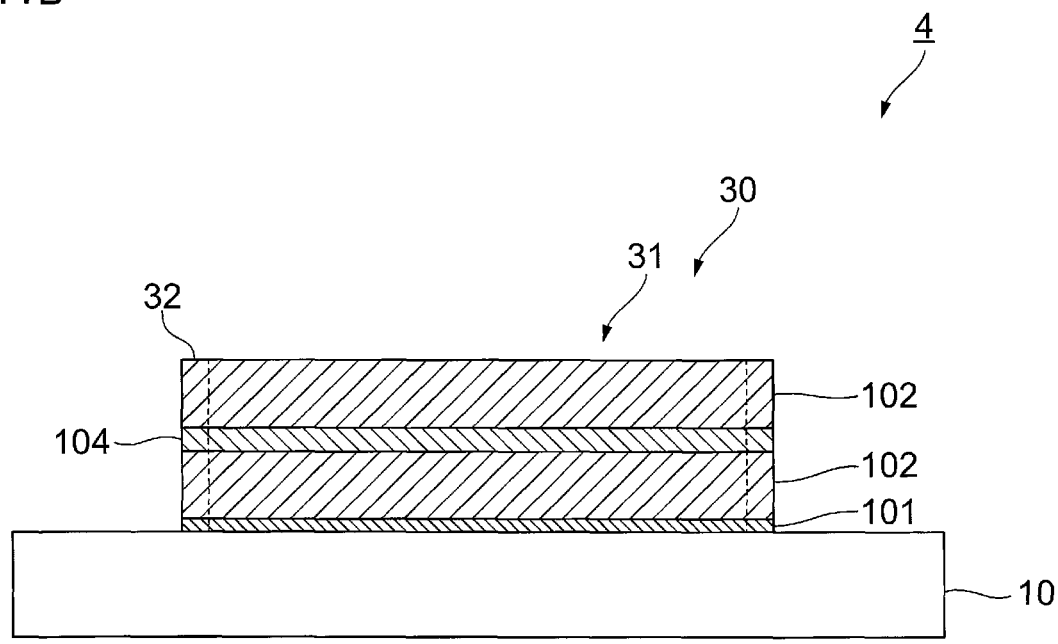

FIGS. 11A and 11B are cross-sectional views of magnetic sensors 3 and 4, respectively, which are modifications of the magnetic sensor 1. FIGS. 11A and 11B correspond to the cross-sectional view taken along the line II-II in FIG. 1. In the magnetic sensors 3 and 4 shown in FIGS. 11A and 11B, the same reference signs are used for the same configurations as the magnetic sensor 1 shown in FIG. 1, etc., and detailed description is omitted here.

The sensitive element 30 may composed of a pre-coat layer 101 and a single soft magnetic material layer 102 laminated on the pre-coat layer 101, as shown in the magnetic sensor 3 in FIG. 11A.

In addition, as shown in the magnetic sensor 4 in FIG. 11B, the sensitive element 30 may be composed of the pre-coat layer 101 and two soft magnetic material layers 102 sandwiching the conductor layer 104, the two soft magnetic material layers 102 being laminated on the pre-coat layer 101.

Although the illustration is omitted, the sensitive element 30 may also be composed of the pre-coat layer 101 and two soft magnetic material layers 102 sandwiching the magnetic domain suppression layer 103, the two soft magnetic material layers 102 being laminated on the pre-coat layer 101.

Furthermore, although the illustration is omitted, the sensitive element 30 may have the pre-coat layer 101 and three or more soft magnetic material layers 102 laminated on the pre-coat layer 101.

In addition, the sensitive element 30 may use an antiferromagnetically coupling layer that antiferromagnetically couples the upper and lower soft magnetic material layers 102, instead of the magnetic domain suppression layer 103 shown in FIGS. 2, 10, etc. As described above, the magnetic domain suppression layer 103 suppresses generation of the closure magnetic domains and antiferromagnetically couples the corresponding upper and lower soft magnetic material layers 102. The antiferromagnetic coupling layer does not have ability to suppress generation of the closure magnetic domains or has poor ability to suppress generation of the closure magnetic domains. Providing the antiferromagnetic coupling layer causes the corresponding upper and lower soft magnetic material layers 102 to be antiferromagnetically coupled to each other, which suppresses a demagnetizing field and thus improves the sensitivity Zmax/Zb of the magnetic sensor 1 (the magnetic sensor 2). Specific examples of materials for such an antiferromagnetic coupling layer include Ru or an Ru alloy.

Furthermore, the sensitive element 30 may include the plural magnetic domain suppression layers 103, the plural conductor layers 104, and the plural antiferromagnetic coupling layers.

The magnetic sensors 1 to 4 may include, between the substrate 10 and the sensitive element 30, a magnet composed of a hard magnetic material layer (hereinafter denoted as a "thin-film magnet") for applying the bias magnetic field Hb to the sensitive element 30. The thin film magnet may be provided such that the N and S magnetic poles are disposed to pass the magnetic flux through the sensitive portions 31 in the sensitive element 30 in the longitudinal direction. When the thin-film magnet is disposed between the substrate 10 and the sensitive element 30, an insulator layer that electrically insulates the thin-film magnet and the sensitive element 30 may be provided on the thin-film magnet. Specific examples of insulators constituting the insulator layer include oxides such as $SiO_2$, $Al_2O_3$, and $TiO_2$, and nitrides such as $Si_3N_4$ and AN. Even when the thin-film magnet and the insulator layer are disposed between the substrate 10 and the sensitive element 30, the substrate 10, the thin-film magnet, and the insulator layer can be collectively viewed as a substrate.

In the above-described embodiment, the disk-shaped substrate 10A was used as the substrate 10A used for forming the plural magnetic sensors 1, but the shape of the substrate is not limited to a disk shape. For example, even when using a substrate 10A that is not disk-shaped, if the soft magnetic material layer 102 is laminated directly on the substrate 10A, depending on the relationship between the substrate 10A and the magnetic circuit 330, there may be a difference in the uniaxial magnetic anisotropy imparted to the soft magnetic material layer 102 due to the difference in position on the substrate 10A, to thereby generate a difference in the magnetic properties of the sensitive element 30 to be formed. On the other hand, as described above, the pre-coat layer 101 is laminated on the substrate 10A, and then soft magnetic material layer 102 is laminated on the pre-coat layer 101; accordingly, the difference in magnetic properties of the sensitive element 30 due to the difference in position on the substrate 10A is less likely to occur, regardless of the shape of the substrate 10A.

Example

Subsequently, the present invention will be described in more detail using examples. Note that the present invention is not limited to the following examples.

Example

After washing the substrate 10A made of glass with a diameter of 95 mm and a thickness of 0.5 mm, a resist pattern 201 having a portion where the sensitive element 30 was formed and serving as an opening, was formed on one of the surfaces (hereinafter, denoted as a front surface) of the substrate 10A by the photolithography method. The arrangement of the sensitive elements 30 formed on the substrate 10A was the same as that shown in FIG. 6. In addition, as shown in FIG. 6, the resist pattern 201 was formed so that the radial direction of the substrate 10A was in the transverse direction of the sensitive portions 31 in each sensitive element 30 formed on the substrate 10A. Furthermore, the resist pattern 201 was formed so that each sensitive element 30 had twenty-four sensitive portions 31 with a length of 3 mm in the longitudinal direction and a length (width) of 120 µm in the transverse direction.

The distance (distance along the radial direction of the substrate 10A, the same applies hereinafter) from the center of the substrate 10A to the sensitive element 30 located at the innermost circumference of the substrate 10A was set at 22 mm. The distance from the center of the substrate 10A to the sensitive element 30 located second from the innermost circumference of the substrate 10A was set at 27 mm. In addition, the distance from the center of the substrate 10A to the sensitive element 30 located third from the innermost circumference of the substrate 10A was set at 33 mm. Furthermore, the distance from the center of the substrate 10A to the sensitive element 30 located at the outermost circumference of the substrate 10A was set at 38 mm. Here, the distance from the center of the substrate 10A to the sensitive element 30 refers to the distance between the center of the substrate 10A and the sensitive portion 31 of the sensitive element 30, the sensitive portion 31 being located nearest the innermost circumference.

Subsequently, the substrate 10A on the front surface of which the resist pattern 201 was formed was placed in the substrate holder 350 of the sputtering device 300 so that the front surface of the substrate 10A faced the target 322. The pressure in the chamber 340 of the sputtering device 300 was reduced to less than or equal to $1 \times 10^{-5}$ Pa. Next, using a mass flow controller, Ar was introduced into the chamber 340 as a sputtering gas, and the pressure in the chamber 340 was adjusted to 0.6 Pa.

Subsequently, the target 322 composed of Co15Nb5Zr containing 15 at % Nb and 5 at % Zr with the balance of Co was used as the soft magnetic material to deposit the pre-coat layer 101 with a thickness of 50 nm on the front surface of the substrate 10A by magnetron sputtering. The sputtering by the sputtering device 300 was performed by supplying the power of 1000 W by the DC power supply 360.

Next, the target 322 was changed to Co18Nb3Zr containing 18 at % Nb and 3 at % Zr with the balance of Co to deposit the first soft magnetic material layer 102a with a thickness of 375 nm on the pre-coat layer 101 by magnetron sputtering.

The target 322 was then changed to 50Cr50Ti containing 50 at % Cr and 50 at % Ti to deposit the first magnetic domain suppression layer 103a with a thickness of 25 nm on the first soft magnetic material layer 102a by the sputtering method.

Thereafter, the target 322 was sequentially changed to Co18Nb3Zr, Ag, Co18Nb3Zr, 50Cr50Ti, and Co18Nb3Zr to deposit the second soft magnetic material layer 102b with a thickness of 375 nm, the conductor layer 104 with a thickness of 400 nm, the third soft magnetic material layer 102c with a thickness of 375 nm, the second magnetic domain suppression layer 103b with a thickness of 25 nm, and the fourth soft magnetic material layer 102d with a thickness of 375 nm sequentially on the first magnetic domain suppression layer 103a by magnetron sputtering.

The substrate 10A taken out of the sputtering device 300 was immersed in N,N dimethylpyrrolidone (NMP) to remove (lift off) the resist pattern 201 as well as the pre-coat layer 101, the soft magnetic material layers 102, the magnetic domain suppression layers 103, and the conductor layer 104 deposited on the resist pattern 201.

Thus, seventy-two sensitive elements 30 were formed, in each of which the pre-coat layer 101, the first soft magnetic material layer 102a, the first magnetic domain suppression layer 103a, the second soft magnetic material layer 102b, the conductor layer 104, the third soft magnetic material layer 102c, the second magnetic domain suppression layer 103b, and the fourth soft magnetic material layer 102d was laminated in this order on the substrate 10A.

Subsequently, the substrate 10A (sensitive element assembly) on which the sensitive elements 30 were formed was placed on a cutting device (dicing machine) with a diamond blade. The substrate 10A exposed between the adjacent sensitive elements 30 was cut and seventy-two magnetic sensors 1 each having the sensitive element 30 on the substrate 10A were obtained. The planar shape of each obtained magnetic sensor 1 was quadrangle of about 4 mm×5 mm.

In each magnetic sensor 1 obtained in the example, the thickness (50 nm) of the pre-coat layer 101 is about 13.3% of the thickness (375 nm) of the first soft magnetic material layer 102a laminated on the pre-coat layer 101.

Comparative Example

Seventy-two magnetic sensors 1 were obtained in the same way as the example except that the first soft magnetic material layer 102a composed of Co18Nb3Zr was deposited directly on the substrate 10A without forming the pre-coat layer 101 composed of Co15Nb5Zr.

(Evaluation)

For the seventy-two magnetic sensors 1 obtained in the example, the relationship between the magnetic field applied in the longitudinal direction of the sensitive portions 31 in the sensitive element 30 and the impedance of the sensitive element 30 was measured. Specifically, an alternating current was passed between the two terminal portions 33 (terminal portions 33a and 33b) of the sensitive element 30 in each magnetic sensor 1, and a curve with the horizontal axis representing the magnetic field H and the vertical axis representing the impedance Z was obtained. From the curve obtained for each magnetic sensor 1, the maximum value Max of the impedance Z, which is a value of the impedance Z in the anisotropic magnetic field Hk, the bias magnetic field Hb, and the amount of impedance change Zmax per unit magnetic field in the bias magnetic field Hb were obtained.

For the seventy-two magnetic sensors 1 obtained in the comparative example, the maximum value Max of the impedance Z, which is a value of the impedance Z in the anisotropic magnetic field Hk, the bias magnetic field Hb, and the amount of impedance change Zmax per unit magnetic field in the bias magnetic field Hb were obtained in a similar manner.

Figure 12:
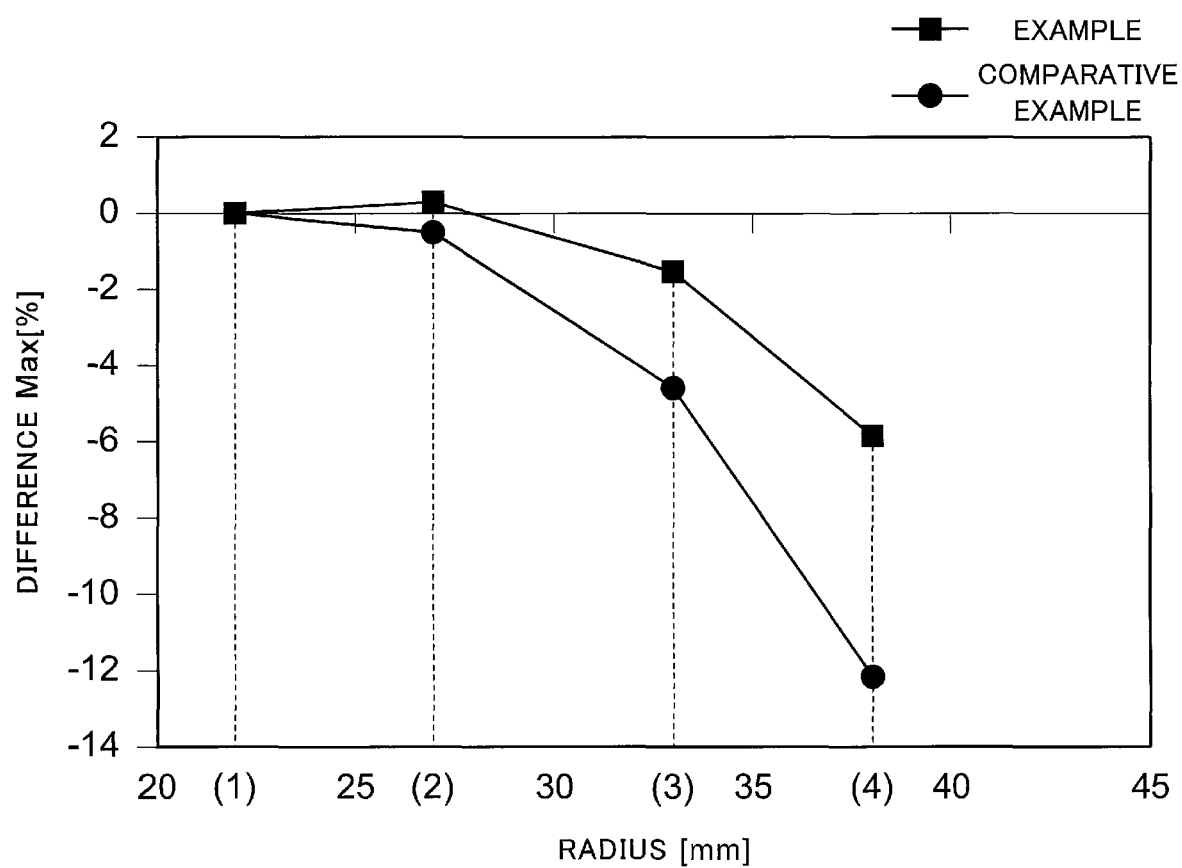
FIG. 12 illustrates a relationship between the position of the sensitive element of the magnetic sensor on the substrate before cutting and the maximum value of impedance of the magnetic sensor in each of the example and the comparative example.

FIG. 12 illustrates a relationship between the position of the sensitive element 30 of the magnetic sensor 1 on the substrate 10A before cutting and the maximum value Max of the impedance Z of the magnetic sensor 1 in each of the example and the comparative example.

Figure 13:
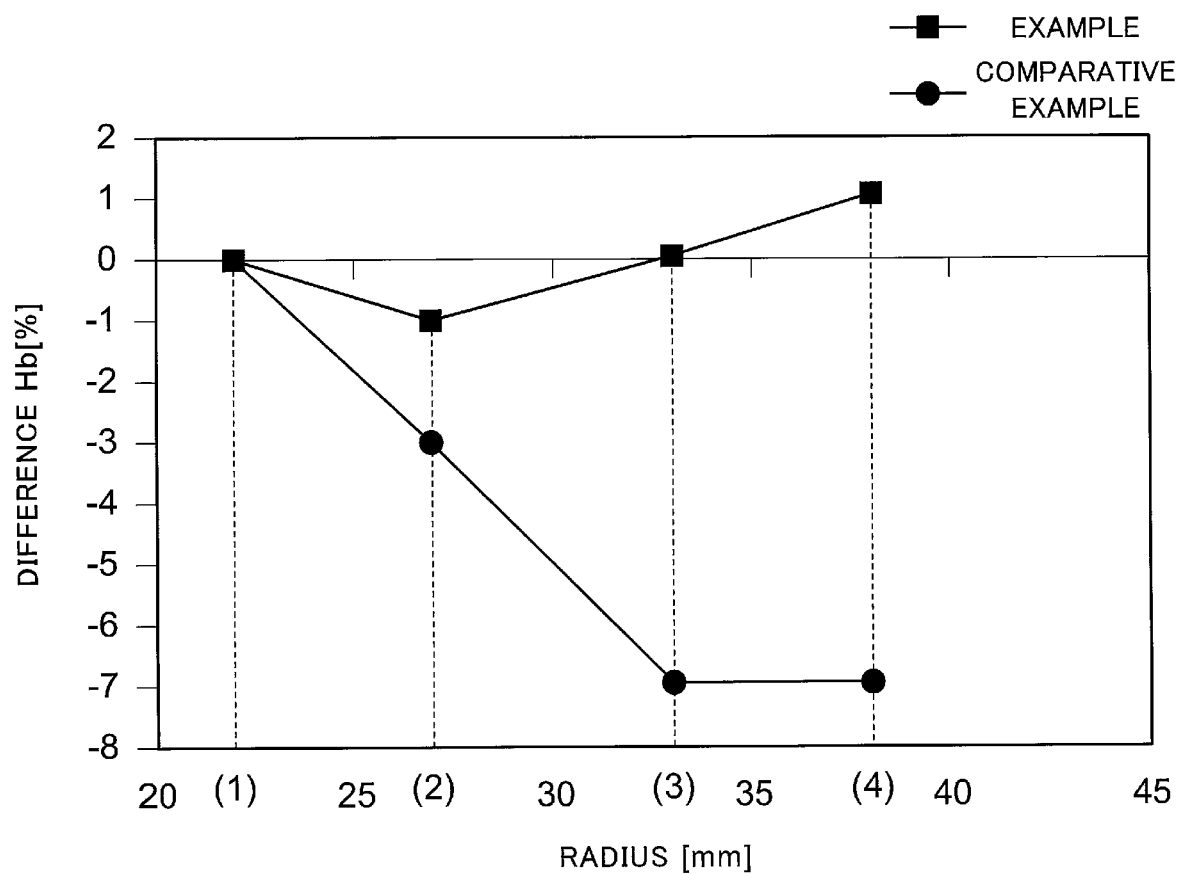
FIG. 13 illustrates a relationship between the position of the sensitive element of the magnetic sensor on the substrate before cutting and the bias magnetic field of the magnetic sensor in each of the example and the comparative example.

FIG. 13 illustrates a relationship between the position of the sensitive element 30 of the magnetic sensor 1 on the substrate 10A before cutting and the bias magnetic field Hb of the magnetic sensor 1 in each of the example and the comparative example.

Figure 14:
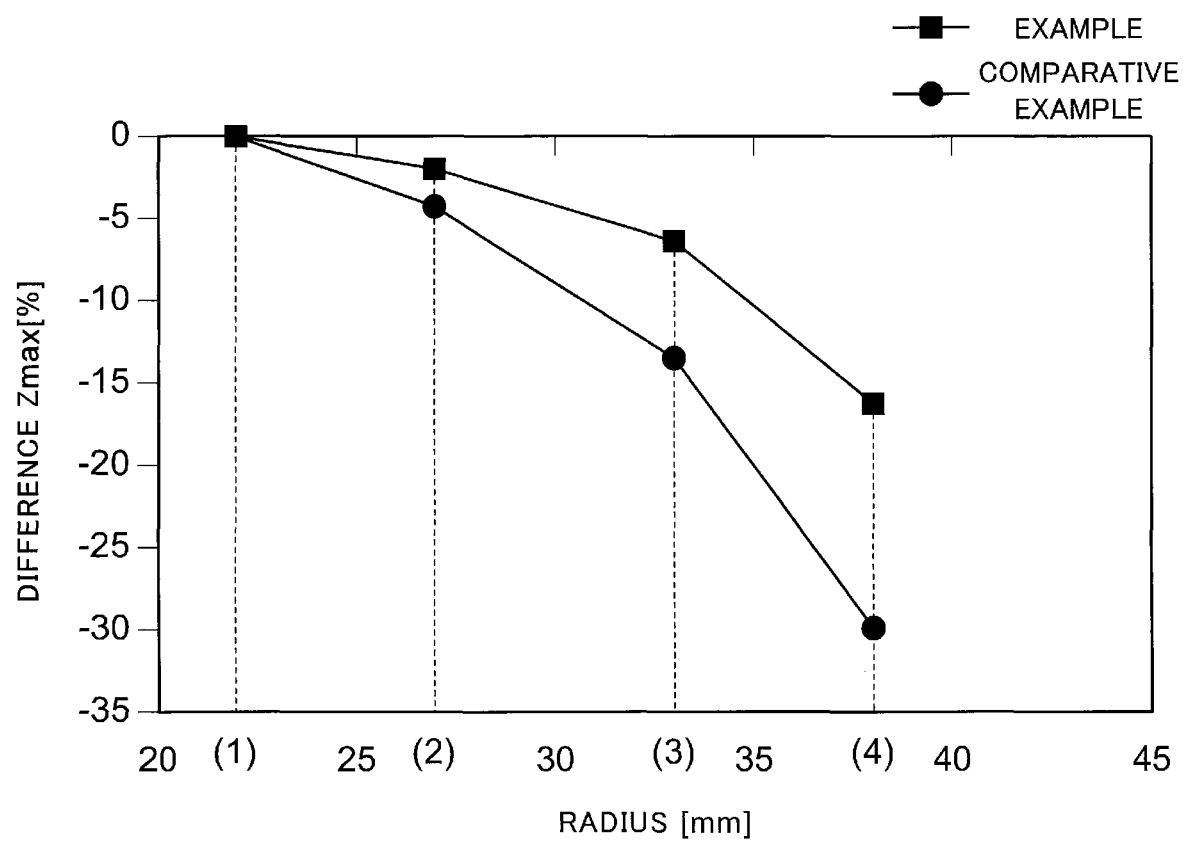
FIG. 14 illustrates a relationship between the position of the sensitive element of the magnetic sensor on the substrate before cutting and the amount of change in the impedance per unit magnetic field in the bias magnetic field of the magnetic sensor in each of the example and the comparative example.

FIG. 14 illustrates a relationship between the position of the sensitive element 30 of the magnetic sensor 1 on the substrate 10A before cutting and the amount of change Zmax in the impedance Z per unit magnetic field in the bias magnetic field Hb of the magnetic sensor 1 in each of the example and the comparative example.

Among the seventy-two magnetic sensors 1 obtained in each of the example and the comparative example, eighteen magnetic sensors 1 with the sensitive element 30 formed at the innermost circumference of the substrate 10A (the sensitive element 30 formed at the position of 22 mm from the center of the substrate 10A) were regarded as the first group. Similarly, eighteen magnetic sensors 1 with the sensitive element 30 formed at the second position from the inner circumference side of the substrate 10A (the sensitive element 30 formed at the position of 27 mm from the center of the substrate 10A) were regarded as the second group. Eighteen magnetic sensors 1 with the sensitive element 30 formed at the third position from the inner circumference of the substrate 10A (the sensitive element 30 formed at the position of 33 mm from the center of the substrate 10A) were regarded as the third group. Furthermore, eighteen magnetic sensors 1 with the sensitive element 30 formed at the outermost circumference of the substrate 10A (the sensitive element 30 formed at the position of 38 mm from the center of the substrate 10A) were regarded as the fourth group.

In this way, the seventy-two magnetic sensors 1 obtained in each of the example and the comparative example were divided into four groups (the first to fourth groups), depending on the position of the sensitive element 30 of each magnetic sensor 1 on the substrate 10A.

In FIG. 12, the average value of the maximum values Max of the impedance Z of the eighteen magnetic sensors 1 belonging to each of the first to fourth groups from among the magnetic sensors 1 obtained in the example and the comparative example are shown in (1) to (4), respectively. In FIG. 12, the maximum value Max of the impedance Z of the magnetic sensors 1 belonging to the first group is set as the reference value (0%), and the maximum values Max of the impedance Z of the magnetic sensors 1 belonging to the second to fourth groups are shown as the differences (%) from the value of the first group.

Similarly, in FIG. 13, the average value of the bias magnetic field Hb of the eighteen magnetic sensors 1 belonging to each of the first to fourth groups from among the magnetic sensors 1 obtained in the example and comparative example are shown in (1) to (4), respectively. In FIG. 13, the bias magnetic field Hb of the magnetic sensors 1 belonging to the first group is set as the reference value (0%), and the bias magnetic field Hb of the magnetic sensors 1 belonging to the second to fourth groups are shown as the differences (%) from the value of the first group.

Furthermore, in FIG. 14, the average value of the amount of change Zmax in the impedance Z per unit magnetic field in the bias magnetic field Hb of the eighteen magnetic sensors 1 belonging to each of the first to fourth groups from among the magnetic sensors 1 obtained in the example and the comparative example are shown in (1) to (4), respectively. In FIG. 14, the amount of change Zmax in the impedance Z per unit magnetic field in the bias magnetic field Hb of the magnetic sensors 1 belonging to the first group is set as the reference value (0%), and the amount of change Zmax in the impedance Z per unit magnetic field in the bias magnetic field Hb of the magnetic sensors 1 belonging to the second to fourth groups are shown as the differences (%) from the value of the first group.

As shown in FIG. 12, it was confirmed that, in the magnetic sensor 1 of the example with the pre-coat layer 101 formed on the substrate 10 (the substrate 10A), the decrease in the maximum value Max of the impedance Z of the magnetic sensor 1 having the sensitive element 30 formed at the outer circumference side of the substrate 10A was suppressed, as compared to the magnetic sensor 1 of the comparative example without forming the pre-coat layer 101. In addition, in the magnetic sensor 1 of the example, as compared to the magnetic sensor 1 in the comparative example, it was confirmed that the difference in the maximum value Max of the impedance Z between the magnetic sensor 1 with the sensitive element 30 formed at the inner circumference side of the substrate 10A and the magnetic sensor 1 with the sensitive element 30 formed at the outer circumference side of substrate 10A was reduced.

In addition, as shown in FIG. 13, it was confirmed that, in the magnetic sensor 1 of the example, the decrease in the bias magnetic field Hb of the magnetic sensor 1 with the sensitive element 30 formed at the outer circumference side of the substrate 10A was suppressed as compared to the magnetic sensor 1 of the comparative example. In addition, it was confirmed that, in the magnetic sensor 1 of the example, the difference in the bias magnetic field Hb between the magnetic sensor 1 with the sensitive element 30 formed at the inner circumference side of substrate 10A and the magnetic sensor 1 with the sensitive element 30 formed at the outer circumference side of substrate 10A was reduced, as compared to the magnetic sensor 1 of the comparative example.

As shown in FIG. 14, it was confirmed that, in the magnetic sensor 1 of the example, the decrease in the amount of change Zmax in the impedance Z per unit magnetic field in the bias magnetic field Hb of the magnetic sensor 1 with the sensitive element 30 formed at the outer circumference side of the substrate 10A was suppressed, as compared to the magnetic sensor 1 of the comparative example. In addition, in the magnetic sensor 1 of the example, as compared to the magnetic sensor 1 in the comparative example, it was confirmed that the difference in the amount of change Zmax in the impedance Z per unit magnetic field in the bias magnetic field Hb between the magnetic sensor 1 with the sensitive element 30 formed at the inner circumference side of the substrate 10A and the magnetic sensor 1 with the sensitive element 30 formed at the outer circumference side of substrate 10A was reduced.

As described above, it was confirmed that, in the magnetic sensor 1 of the example with the pre-coat layer 101 formed on the substrate 10 (the substrate 10A), the difference in the magnetic properties between the plural magnetic sensors 1 formed from the same substrate was reduced, as compared to the magnetic sensor 1 of the comparative example without forming the pre-coat layer 101.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art without departing from the scope and spirit of the present invention. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A magnetic sensor comprising:
    a substrate; and
    at least one sensitive portion disposed on the substrate and having a longitudinal direction and a transverse direction, the sensitive portion sensing a magnetic field by a magnetic impedance effect, wherein
    the sensitive portion includes a soft magnetic material layer composed of a soft magnetic material having uniaxial magnetic anisotropy in a direction intersecting the longitudinal direction, the soft magnetic material layer sensing the magnetic field, and a secondary soft magnetic material layer laminated between the substrate and the soft magnetic material layer, the secondary soft magnetic material layer being composed of a soft magnetic material with large saturation magnetization compared to the soft magnetic material constituting the soft magnetic material layer, and
    the secondary soft magnetic material layer contacts the soft magnetic material layer.

2. The magnetic sensor according to claim 1, wherein the secondary soft magnetic material layer has a thickness less than or equal to 30% of a thickness of the soft magnetic material layer.

3. The magnetic sensor according to claim 2, wherein the secondary soft magnetic material layer has a thickness greater than or equal to 5 nm.

4. The magnetic sensor according to claim 1, wherein at least one sensitive element includes a plurality of sensitive portions arranged in the transverse direction with a gap between adjacent two of the sensitive portions, each of the sensitive portions including the soft magnetic material layer and the secondary soft magnetic material layer.

5. The magnetic sensor according to claim 1, wherein the at least one sensitive portion includes a plurality of the soft magnetic material layers laminated, adjacent two of the soft magnetic material layers sandwiching a conductor layer with conductivity higher than the soft magnetic material layer, and
    the secondary soft magnetic material layer is laminated between the substrate and one of the plurality of the soft magnetic material layers nearest the substrate.

6. The magnetic sensor according to claim 5, wherein the at least one sensitive portion includes another secondary soft magnetic material layer between the conductor layer and one of the plurality of the soft magnetic material layers above and nearest the conductor layer, the another secondary soft magnetic material layer composed of a soft magnetic material with large saturation magnetization compared to the soft magnetic material constituting the soft magnetic material layer.

7. The magnetic sensor according to claim 1, wherein
    the at least one sensitive portion includes a plurality of the soft magnetic material layers and a magnetic domain suppression layer between adjacent two of the plurality of the soft magnetic material layers, the magnetic domain suppression layer suppressing generation of a closure magnetic domain in the soft magnetic material layers, and
    the secondary soft magnetic material layer is laminated between the substrate and one of the plurality of the soft magnetic material layers nearest the substrate.

8. The magnetic sensor according to claim 1, wherein
    the soft magnetic material layer is composed of an amorphous alloy containing Co, Nb and Zr, and
    the secondary soft magnetic material layer is composed of an amorphous alloy containing Co, Nb and Zr, the amorphous alloy for the secondary soft magnetic material layer having a small Nb ratio compared to the amorphous alloy constituting the soft magnetic material layer.

9. The magnetic sensor according to claim 1, wherein
    the soft magnetic material layer is composed of an amorphous alloy based on Co, and
    the secondary soft magnetic material layer is composed of an amorphous alloy based on Co with large saturation magnetization compared to the amorphous alloy constituting the soft magnetic material layer.

10. The magnetic sensor according to claim 7, wherein the magnetic domain suppression layer is composed of any one of Ru, CrTi, AlTi, CrB, CrTa, CoW, NiP, and $SiO_2$.

11. A method of manufacturing a magnetic sensor comprising:
    forming an underlayer by laminating a soft magnetic material with a predetermined saturation magnetization on a surface of a substrate by magnetron sputtering;
    forming a soft magnetic material layer with uniaxial magnetic anisotropy in a predetermined direction by laminating a soft magnetic material on the underlayer, the soft magnetic material for the soft magnetic material layer having small saturation magnetization compared to the soft magnetic material constituting the underlayer by magnetron sputtering, the soft magnetic material layer contacting the underlayer; and
    forming a plurality of sensitive elements at a portion of the soft magnetic material layer where the uniaxial magnetic anisotropy is imparted, the plurality of sensitive elements sensing a magnetic field.

12. A sensitive element assembly comprising:
a substrate; and
a plurality of sensitive elements each having at least one sensitive portion formed on a surface of the substrate and having a longitudinal direction and a transverse direction, the sensitive portion sensing a magnetic field by a magnetic impedance effect, wherein
the sensitive portion in each of the sensitive elements includes a soft magnetic material layer composed of a soft magnetic material having uniaxial magnetic anisotropy in a direction intersecting the longitudinal direction and sensing the magnetic field, and a secondary soft magnetic material layer laminated between the substrate and the soft magnetic material layer, the secondary soft magnetic material layer being composed of a soft magnetic material with large saturation magnetization compared to the soft magnetic material constituting the soft magnetic material layer, and
the secondary soft magnetic material layer contacts the soft magnetic material layer.

* * * * *